(12) United States Patent
Hejna, Jr.

(10) Patent No.: US 6,374,225 B1
(45) Date of Patent: Apr. 16, 2002

(54) METHOD AND APPARATUS TO PREPARE LISTENER-INTEREST-FILTERED WORKS

(75) Inventor: Donald J. Hejna, Jr., Los Altos, CA (US)

(73) Assignee: Enounce, Incorporated, Palo Alto, CA (US)

( * ) Notice: Subject to any disclaimer, the term of this patent is extended or adjusted under 35 U.S.C. 154(b) by 0 days.

(21) Appl. No.: 09/169,031

(22) Filed: Oct. 9, 1998

(51) Int. Cl.[7] .......................... G10L 11/00; G10L 21/00; G06F 15/00
(52) U.S. Cl. ........................ 704/270; 704/503; 704/200
(58) Field of Search .................................. 704/270, 503, 704/500, 207, 208, 200, 211; 434/156, 157, 185, 307 R, 350, 362

(56) References Cited

U.S. PATENT DOCUMENTS

| | | | |
|---|---|---|---|
| 5,630,013 A | 5/1997 | Suzuki et al. ............... | 395/2.25 |
| 5,694,521 A | * 12/1997 | Shlomot et al. ............. | 704/262 |
| 5,717,818 A | * 2/1998 | Nejime et al. ............... | 704/211 |
| 5,806,023 A | 9/1998 | Satyamurti ................... | 704/211 |
| 5,813,862 A | * 9/1998 | Merzenich et al. .......... | 434/185 |
| 5,842,172 A | 11/1998 | Wilson ........................ | 704/503 |
| 5,893,062 A | * 4/1999 | Bhadkamkar et al. ....... | 704/270 |
| 6,036,496 A | * 3/2000 | Miller et al. ................. | 434/156 |

OTHER PUBLICATIONS a Ph.D Dissertation submitted to Mississippi State University, Mississippi by Rajeev Agarwal 1995 entitled "Semantic Feature Extraction from Technical Texts with Limited Human Intervention".

* cited by examiner

*Primary Examiner*—Richemond Dorvil
*Assistant Examiner*—Angela Armstrong
(74) *Attorney, Agent, or Firm*—Michael B. Einschlag

(57) ABSTRACT

An embodiment of the present invention is a method for generating a listener-interest-filled work for an audio or audio-visual work, which method comprises the steps of: (a) generating one or more average speed contours for one or more audio or audio-visual works for one or more categories of users; (b) converting the one or more average speed contours to one or more conceptual speed association data structures; and (c) forming a listener-interest-filtered conceptual speed association data structure from the one or more conceptual speed association data structures. This embodiment further includes the step of using the listener-interest-filtered conceptual speed association data structure to create a listener-interest-filtered audio or audio-visual work; or the step of converting the listener-interest-filtered conceptual speed association data structure to a listener-interest-filtered speed contour; or the step of using the listener-interest-filtered speed contour to create a listener-interest-filtered audio or audio-visual work.

62 Claims, 11 Drawing Sheets

FIG. 7

7100 — FOR A FREE PRODUCT GUIDE AND BROCHURE CALL 1-800-555-1212 AND SPEAK WITH AN INSURANCE SPECIALIST ABOUT YOUR PARTICULAR SITUATION.

METHOD AND APPARATUS TO PREPARE LISTENER-INTEREST-FILTERED WORKS

TECHNICAL FIELD OF THE INVENTION

The present invention pertains to the field of speech, audio, and audio-visual works. In particular, the present invention pertains to method and apparatus for receiving listener input regarding desired speed of playback for portions of a speech, audio, and/or audio-visual work and for developing a "Speed Contour" or "Conceptual Speed Association" data structure which represents the listener input. The listener input serves as a proxy for the listener's interest in, and/or for the listener's ability to comprehend (and/or transcribe), the speech, audio, and/or audio-visual work and will be referred to herein as "listener interest." For example, the listener might want to slow down some portion of the speech, audio, and/or audio-visual work if the listener was interested in enjoying it more fully, or if the listener was having a hard time comprehending the portion, or if the listener was transcribing information contained in the portion. In further particular, the present invention pertains to method and apparatus for replaying the speech, audio and/or audio-visual work in accordance with the Speed Contour or Conceptual Speed Association data structure to produce a "listener-interest-filtered" work ("LIF" work). The LIF work is useful in a number of applications such as, for example, education, advertising, news delivery, entertainment, public safety announcements and the like.

BACKGROUND OF THE INVENTION

Presently known methods for Time-Scale Modification ("TSM") enable digitally recorded audio to be modified so that a perceived articulation rate of spoken passages, i.e., a speaking rate, can be modified dynamically during playback. Typical applications of such TSM methods include, but are not limited to, speed reading for the blind, talking books, digitally recording lectures, slide shows, multimedia presentations and foreign language learning. In a typical such application, referred to herein as a Listener-Directed Time-Scale Modification application ("LD-TSM"), a listener can control the speaking rate during playback of a previously recorded speaker. This enables the listener to "speed-up" or "slow-down" the articulation rate and, thereby, the information delivery rate provided by the previously recorded speaker. As is well known to those of ordinary skill in the art, the use of the TSM method in the above-described LD-TSM application enables the sped-up or slowed-down speech or audio to be presented intelligibly at the increased or decreased playback rates. Thus, for example, a listener can readily comprehend material through which he/she is fast-forwarding.

In a typical LD-TSM system, input from the listener can be specified in a number of different ways. For example, input can be specified through the use of key presses (button pushes), mouse movements, or voice commands, all of which are referred to below as "keypresses." As a result, one can readily appreciate that an LD-TSM system enables a listener to adjust the information delivery rate of a digital audio medium to suit his/her interests and speed of comprehension.

As one can readily appreciate from the above, in order to optimize the use of such an LD-TSM system, there is a need for determining how listeners interact with audio media that provide TSM. In particular, the actual information delivery rate selected by a listener depends on diverse factors such as intelligibility of a speaker, listener interest in the subject matter, listener familiarity with the subject matter, whether the listener is transcribing the content, and the general amount of time the listener has allotted for receiving the contents of the material.

Prior art methods for determining listener interest in portions of speech and/or audio are inherently inaccurate. Specifically, these methods involve detecting fast-forward and rewind patterns of, for example, a cassette tape produced by button pushes. The use of such fast-forward or rewind patterns suffers from various drawbacks. For example, the listener often alternates between fast-forwarding and rewinding over a particular piece of audio material because the information is either not presented, or is unintelligible while fast-forwarding or rewinding. In addition, whenever a playback location is advanced, this either interrupts playback while advancing through the audio material or presents unintelligible versions of the audio material ("chipmunk like" sounds for speed-up, etc.). As such, current methods of determining listener interest are of little use for determining an optimal information delivery rate.

As one can readily appreciate from the above, a need exists in the art for a method and apparatus for determining listener interest in portions of speech, audio, and/or audio-visual works. In addition, a need exists in the art for a method and apparatus for replaying speech, audio and/or audio-visual works in accordance with the determination of listener interest to provide a listener-interest-filtered work ("LIF" work).

SUMMARY OF THE INVENTION

Embodiments of the present invention advantageously satisfy the above-identified need in the art and provide method and apparatus for determining listener interest in portions of speech, audio, and/or audio-visual works and for developing Speed Contours or Conceptual Speed Association data structures that represent measures of listener interest. In addition, further embodiments of present invention provide method and apparatus for utilizing the Speed Contours or Conceptual Speed Association data structures to play speech, audio and/or audio-visual works in accordance with the Speech Contours or the Conceptual Speed Association data structures to provide listener-interest-filtered works ("LIF" works).

An embodiment of the present invention is an apparatus for generating a Speed Contour which includes an affinity information used to obtain a time-scale modification (TSM) rate and an identifier information used to obtain an identifier of a portion of an audio or audio-visual work associated with the TSM rate, which apparatus comprises: (a) a user input apparatus that receives user information and directs input of a portion of the audio or audio-visual work; (b) a time-scale modification system, responsive to an identifier of the portion, the portion, and a TSM rate, that generates a time-scale modified portion; (c) a time-scale modification monitor, responsive to the user information, the identifier of the portion, and the portion, that generates the TSM rate and the identifier of a portion associated with the TSM rate; and (d) a speed contour generator, responsive to the TSM rate and the identifier of the associated portion, that generates the Speed Contour.

Another embodiment of the present invention is an apparatus for generating a Conceptual Speed Association data structure which includes an affinity information used to obtain a time-scale modification (TSM) rate and a concept information used to obtain a concept identifier for a portion of an audio or audio-visual work associated with the TSM rate, which apparatus comprises: (a) a user input apparatus that receives user information and directs input of a portion of the audio or audio-visual work; (b) a time-scale modification system, responsive to an identifier of the portion, the portion, and a TSM rate, that generates a time-scale modified portion; (c) a concept decoder, responsive to the identifier of the portion and the portion, that generates a concept for the portion; (d) a time-scale modification concept monitor, responsive to the user information and the concept, that generates the TSM rate and a concept identifier associated with the TSM rate; and (e) a conceptual speed association data structure generator, responsive to the TSM rate and the associated concept identifier, that generates the Conceptual Speed Association data structure.

Another embodiment of the present invention is an apparatus which plays an audio or audio-visual work in conjunction with a Speed Contour which includes an affinity information used to obtain a time-scale modification (TSM) rate and an identifier information used to obtain an identifier of a portion of an audio or audio-visual work associated with the TSM rate, which apparatus comprises: (a) an input apparatus that directs input of a portion of the audio or audio-visual work; (b) a time-scale modification system, responsive to an identifier of the portion, the portion, and a TSM rate, that generates a time-scale modified portion; (c) playback apparatus, responsive to the time-scale modified portion, that plays the time-scale modified portion; and (d) a time-scale modification rate determiner, responsive to the Speed Contour and the identifier of the portion, that generates the TSM rate.

Another embodiment of the present invention is an apparatus which plays an audio or audio-visual work in conjunction with a Conceptual Speed Association data structure which includes an affinity information used to obtain a time-scale modification (TSM) rate and a concept information used to obtain a concept identifier for a portion of an audio or audio-visual work associated with the TSM rate, which apparatus comprises: (a) an input apparatus that directs input of a portion of the audio or audio-visual work; (b) a time-scale modification system, responsive to an identifier of the portion, the portion, and a TSM rate, that generates a time-scale modified portion; (c) playback apparatus, responsive to the time-scale modified portion, that plays the time-scale modified portion; (d) a concept decoder, responsive to the identifier of the portion and the portion, that generates a concept for the portion; and (e) a time-scale modification concept look-up, responsive to the concept and the Conceptual Speed Association data structure, that generates the TSM rate.

Another embodiment of the present invention is a method for generating a listener-interest-filtered work for an audio or audio-visual work, which method comprises the steps of: (a) generating one or more Average Speed Contours for one or more audio or audio-visual works for one or more categories of users; (b) converting the one or more Average Speed Contours to one or more Conceptual Speed Association data structures; and (c) forming a listener-interest-filtered Conceptual Speed Association data structure from the one or more Conceptual Speed Association data structures. This embodiment further includes the step of using the listener-interest-filtered Conceptual Speed Association data structure to create a listener-interest-filtered audio or audio-visual work; or the step of converting the listener-interest-filtered Conceptual Speed Association data structure to a listener-interest-filtered Speed Contour; or the step of using the listener-interest-filtered Speed Contour to create a listener-interest-filtered audio or audio-visual work; or the step of using any of the above to determine listener interest, preferred delivery rate, or listener familiarity with concepts or material in an audio or audio-visual work.

BRIEF DESCRIPTION OF THE FIGURE

FIG. 7 shows a display of a transcript of an audio or audio visual work;

DETAILED DESCRIPTION

Embodiments of the present invention pertain to method and apparatus for receiving listener input regarding desired speed of playback for portions of a speech, audio, and/or audio-visual work and for developing a "Speed Contour" or a "Conceptual Speed Association" data structure which represents the listener input. The listener input serves as a proxy for the listener's interest in, and/or for the listener's ability to comprehend, the speech, audio, and/or audio-visual work and will be referred to herein as "listener interest." For example, the listener might want to slow down some portion of the speech, audio, and/or audio-visual work if the listener was interested in enjoying it more fully or if the listener was having difficulty comprehending the portion. Further embodiments of the present invention pertain to a method and apparatus for replaying a speech, audio and/or audio-visual work in accordance with the Speed Contour or Conceptual Speed Association data structure to produce a new work which is referred to herein as a "listener-interest-filtered" work ("LIF" work). As will described in detail below, the LIF work is useful in, for example, education, advertising, news delivery, public safety announcements and the like.

Generation of a Speed Contour and a Conceptual Speed Association Data Structure

In accordance with the present invention, embodiments of a first aspect of the present invention generate a Speed Contour, which Speed Contour is optionally stored for later use.

Figure 1:
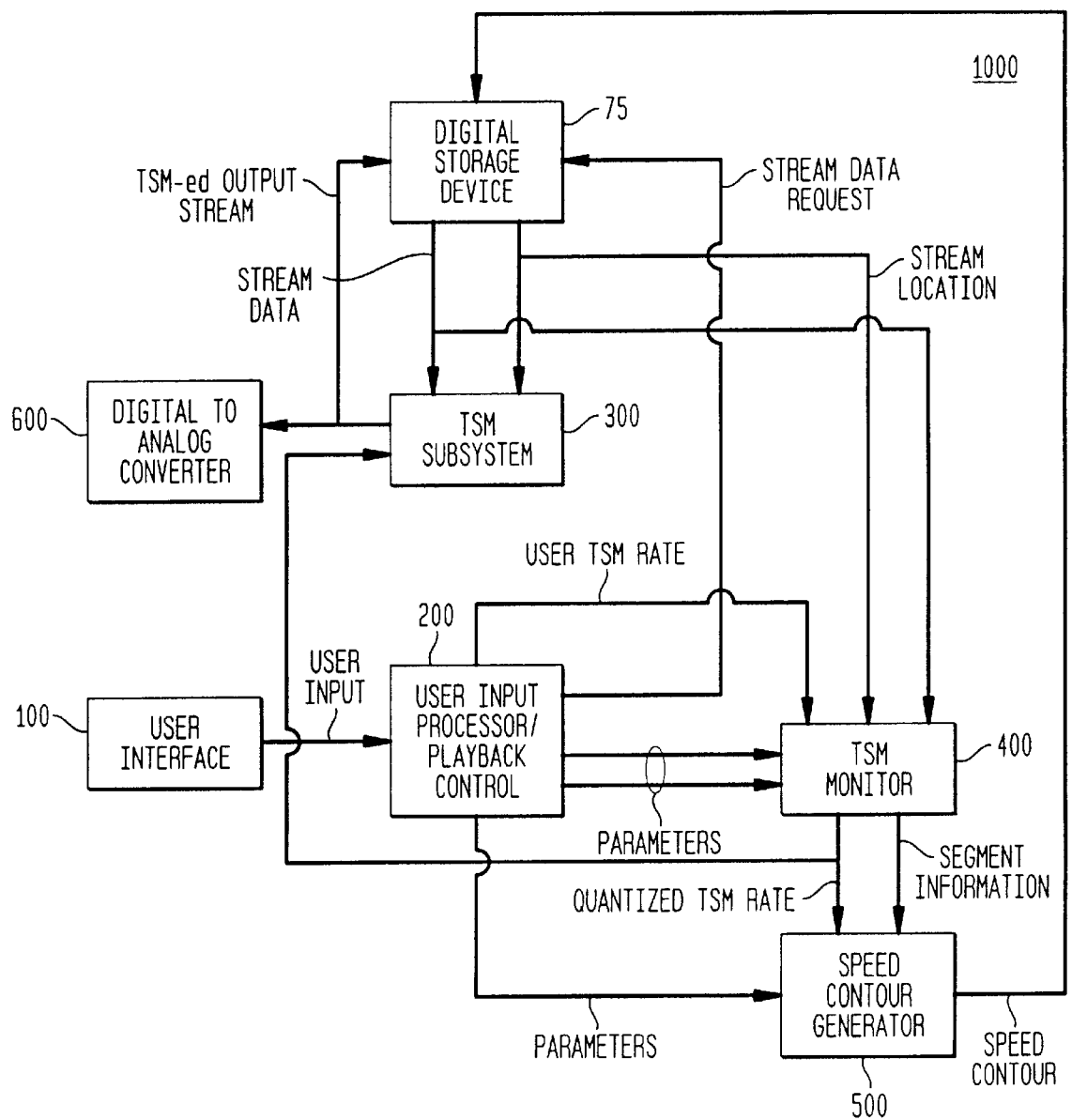
FIG. 1 shows a block diagram of an embodiment of a first aspect of the present invention which generates a Speed Contour for an audio or audio-visual work.

FIG. 1 shows a block diagram of embodiment 1000 of a first aspect of the present invention which generates a Speed Contour for an audio or audio-visual work. As shown in FIG. 1, embodiment 1000 comprises User Interface 100 ("UI 100") which receives input from a user. UI 100 provides output signals which indicate input from the user. The user input is interpreted by User Input Processor/Playback Control 200 ("UIP/PC 200") of embodiment 1000 to indicate the following options selected by the user: (a) select a file to play, which file corresponds to a particular audio or audio-visual work (the selected file can be input to embodiment 1000 directly or it can be a file that has been stored by embodiment 1000); (b) initiate playback of the selected file; (c) halt playback of the selected file; (d) pause playback of the selected file; (e) modify the Time-Scale Modification ("TSM") rate, i.e., the playback rate, of a portion of the audio or audio-visual work being played; or (f) specify parameters Interval_Size, Speed_Change_Resolution, Average_or_Overwrite, and Log_Repeats that are used by the apparatus in a manner that will be explained in detail below in generating the Speed Contour. There exist many apparatus which are well known to those of ordinary skill in the art for receiving input from a user. For example, it is well known to those of ordinary skill in the art that commercially available equipment exists for detecting: (a) the pressing of a key; (b) the activation of a switch on a mouse; (c) the movement of a slider or position indicator; and (d) user speech commands and, in response, for sending digital data representing the keypress, the switch activation, the movement of the slider or position indicator, or the speech commands to a processing unit.

UIP/PC 200 receives the user input from UI 100 and (a) converts the user input to numeric values; (b) interprets the user input to set the values of parameters and to control the creation, use, modification or overriding of the Speed Contour; and (c) directs accessing and loading of a data stream from an audio or audio-visual work by sending a stream data request to Digital Storage Device 75 or other audio or audio-visual data source (to perform playback control). In the case of Digital Storage Device 75, UIP/PC 200 may request access to a file of digital data representing an audio or audio-visual work stored in a file-system on the device. To direct accessing and loading of a data stream from an audio or audio-visual work, UIP/PC 200 interprets the user input and the location of digital samples representing the audio or audio-visual work stored on Digital Storage Device 75 to compute playback positions for the selected file at a particular sample.

Digital Storage Device 75 receives the following as input: (a) stream data requests from UIP/PC 200; and optionally (b) Time-Scale Modified output from TSM Subsystem 300; and optionally (c) a stream of data representing the Speed Contour from Speed Contour Generator 500. Digital Storage Device 75 produces the following as output: (a) a stream of data representing an audio or audio-visual work and (b) a stream of location information, for example position in a file, of the data stream being output. There are many methods well known to those of ordinary skill in the art for utilizing digital storage devices, for example a "hard disk drive", to store and retrieve general purpose data.

The audio or audio-visual work is typically stored in digital form on Digital Storage Device 75. There exist many commercially available apparatus which are well known to those of ordinary skill in the art for use as a digital storage device such as, for example, a CD-ROM, a digital tape, a magnetic disc. Digital storage device 75 receives data requests from UIP/PC 200 in accordance with methods which are well known to those of ordinary skill in the art to provide a stream of digital samples representing the audio and/or audio-visual work. In alternative embodiments, the audio or audio-visual work is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 300.

TSM Subsystem 300 receives as input: (a) a stream of samples representing portions of the audio or audio-visual work from Digital Storage Device 75; (b) stream location information from Digital Storage Device 75 used to identify the position in the data stream of the samples being sent, for example, a sample count or time value; and (c) a desired TSM rate, or playback rate, from Time-Scale Modification Monitor 400 ("TSM Monitor 400"). Output from TSM Subsystem 300 is applied as input to: (a) Digital to Analog Converter/Audio and/or Audio-Visual Playback Device 600 ("DA/APD 600") and, optionally, to (b) Digital Storage 75 for storage of the Time-Scale Modified output, i.e. the LIF work, if desired. DA/APD 600 is apparatus which is well known in the art for receiving digital samples and constructing an audio or audio-visual work. In accordance with the present invention, the output of TSM Subsystem 300 is a stream of digital samples representing an audio or audio-visual work whose playback rate, supplied from TSM Monitor 400, provides feedback to the user about his/her input TSM rate specification. In particular, the user listens to the Time-Scale Modified output and can change the TSM rate, or playback rate, by providing further input using UI 100. Specifically, if the user wishes to speed up or slow down a portion of the audio or audio-visual work just played, the user can provide input using UI 100 to rewind the audio or audio-visual work to a desired portion and replay it again with a modified TSM rate, or playback rate. In this manner, the user determines a desired TSM rate, or playback rate, for each portion of the audio or audio-visual work. TSM Subsystem 300 modifies the input stream of data in accordance with well known TSM methods to produce, as output, a stream of samples that represents a Time-Scale Modified signal. In a preferred embodiment of the present invention, the TSM method used is a method disclosed in U.S. Pat. No. 5,175,769 (the '769 patent), which '769 patent is incorporated by reference herein, the inventor of the present invention also being a joint inventor of the '769 patent. As one of ordinary skill in the art can readily appreciate, whenever embodiment 1000 provides playback for an audio-visual work, TSM Subsystem 300 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped.

TSM Monitor 400 receives the following as input to guide embodiment 1000 in generating a Speed Contour: (a) user input that has been translated by UIP/PC 200 to a desired TSM rate, or playback rate (which desired TSM rate, or playback rate, may indicate a change of TSM rate, or playback rate, for a portion of the input audio or audio-visual work being perceived); (b) a stream of samples representing portions of the audio or audio-visual work from Digital Storage Device 75; (c) current stream location information from Digital Storage Device 75 used to identify the position in the stream of the samples being sent, for example, a sample count or time value of the beginning of the group of samples transferred from Digital Storage Device 75; and (d) parameters Interval_Size and Speed_Change_Resolution from UIP/PC 200.

A Speed Contour is information, for example, in the form of a stream of data, that represents a desired TSM rate, or playback rate, for an audio or audio-visual work for some or all points of the work. In practice, the time resolution required for embodiment 1000 to reproduce the desired TSM rate, or playback rate, for an audio or audio-visual work varies slowly compared with the sampling rate of the digital signal which comprises the audio or audio-visual work. As a result, and in accordance with a preferred embodiment of the present invention, the Speed Contour comprises a single TSM value which is associated with a particular group of samples of the audio or audio-visual work that correspond to a particular segment of that work. Alternatively, one could associate a TSM value with each sample of the input audio-visual work.

In practice the resolution required for reproducing the TSM rate, or playback rate, is limited. Thus, in a preferred embodiment of the present invention, instead of using a range of continuous TSM rates, or playback rates, the TSM rates are quantized into fixed intervals and the values of these quantized levels used to represent the TSM rates. This will be explained further below.

Two parameters guide the described embodiment of TSM Monitor 400:

1. Interval_Size: this parameter determines the time interval, given in terms of a number of samples of the input audio or audio-visual work, that should elapse between analysis of changes in the TSM rate, or playback rate.
2. Speed_Change_Resolution: this parameter indicates the difference in amount between the quantized levels used to represent the TSM rate, or playback rate.

TSM Monitor 400 uses the parameter Interval_Size to segment the input digital stream and to determine a single TSM rate for each segment of the input digital stream, for example, the TSM rate at the beginning or end of the segment or a mathematical average of the TSM rates over the segment. Note, the length of each segment is given by the value of the Interval_Size parameter.

TSM Monitor 400 uses the parameter Speed_Change_Resolution to determine appropriate TSM rates to pass to TSM Subsystem 300 and to Speed Contour Generator 500. The input TSM rate desired by the user is converted to one of the quantized levels in a manner which is well known to those of ordinary skill in the art. This means that the output TSM rate, or playback rate, can change only if the input desired TSM rate changes by an amount that exceeds the difference between quantized levels, i.e., Speed_Change_Resolution. As a practical matter then, parameter Speed_Change_Resolution filters small changes in TSM rate, or playback rate, that would occur if the user changed the TSM rate, or playback rate, by a small amount and then immediately changed it back to its previous value. The parameters Interval_Size and Speed_Change_Resolution can be set as predetermined parameters for embodiment 1000 in accordance with methods which are well known to those of ordinary skill in the art or they can be entered and/or varied by receiving user input through UI 100 in accordance with methods which are well known to those of ordinary skill in the art. However, the manner in which these parameters are set and/or varied are not shown for ease of understanding the present invention.

TSM Monitor 400 produces, as output, a pair of values for each segment of the input stream specified by Interval_Size: (a) one of the pair of values represents location information in the input digital stream for the segment and (b) the other of the pair of values represents the TSM rate, or playback rate, requested by the user for that segment. The pair of values is applied as input to Speed Contour Generator 500 and the other of the pair of values which represents the TSM rate is applied as input to TSM Subsystem 300.

Figure 2:
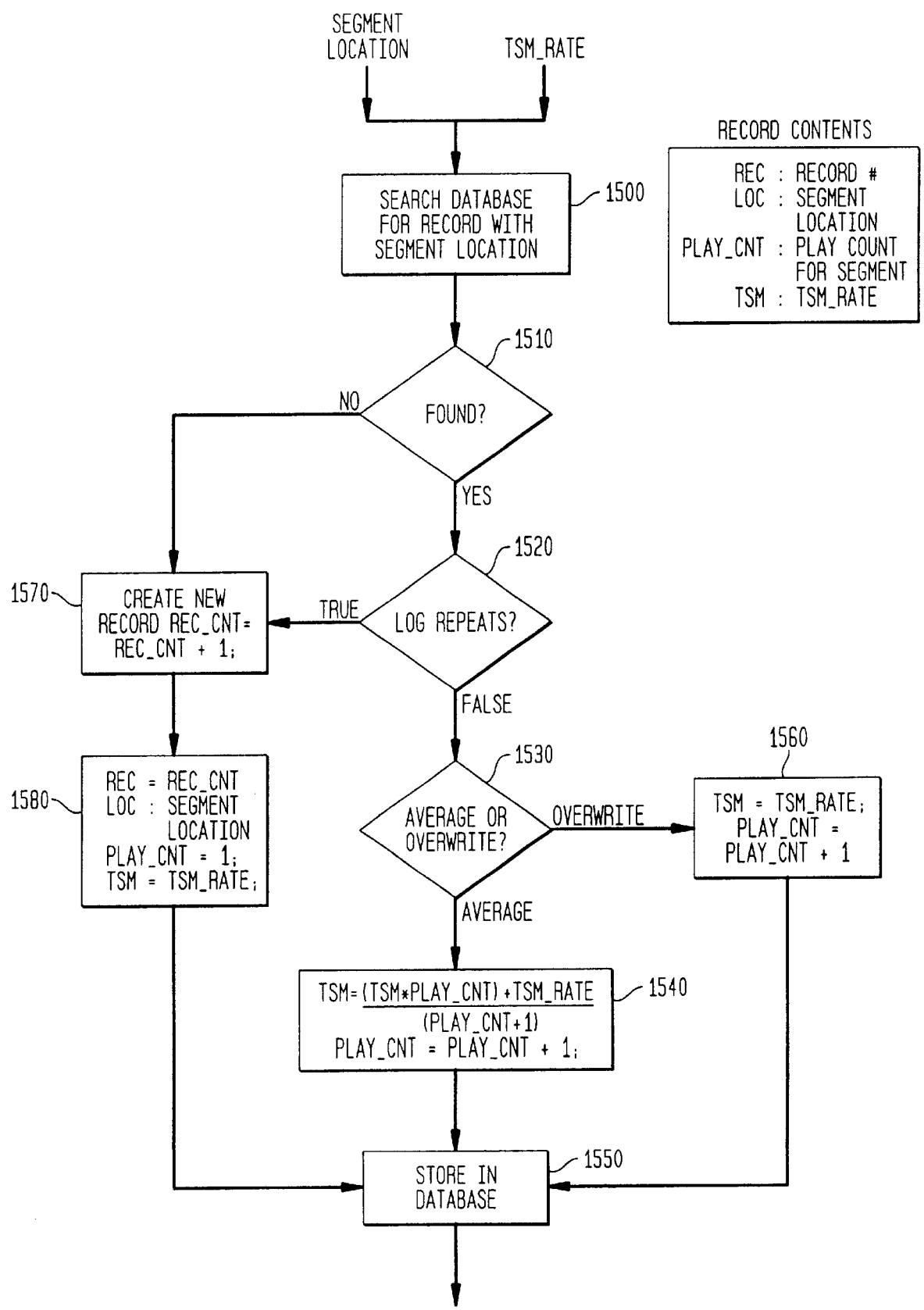
FIG. 2 shows a flowchart of an algorithm used in one embodiment of a Speed Contour Generator shown in FIG. 1.

Speed Contour Generator 500 accepts as input: (a) one of the pair of values that represents location information in the input digital stream for a segment from TSM Monitor 400; (b) the other of the pair of values that represents the TSM rate, or playback rate, for the segment from TSM Monitor 400; and (c) and parameters Average_or_Overwrite and Log_Repeats from UIP/PC 200. Speed Contour Generator 500 uses a database or scratch-pad memory to maintain a list of records; each record stores information pertaining to the TSM rate and stream position information for the TSM rate. FIG. 2 shows a flowchart of an algorithm used in one embodiment of Speed Contour Generator 500 to generate the Speed Contour. The following fields are used in the records used by the embodiment:

1. Rec: a unique number identifying each record and its allocation/creation order.
2. Loc: a data field containing stream location information for a segment of the input stream.
3. Play_Cnt: a data field containing the number of times a segment has been played. Play_Cnt is set to 1 when a record is created.
4. TSM: a data field representing the TSM rate for the segment.

In addition to the above-defined data fields, two parameters guide Speed Contour Generator 500 in generating a Speed Contour:

1. Average_or_Overwrite: this parameter specifies how information should be logged if the user "rewinds" or moves the playback location manually (i.e., with a mouse, slider or position indicator) so that a region of the input audio or audio-visual work previously played is replayed again. If the value of the parameter is "Average", the TSM rate, or playback rate, for the repeated segment is calculated by averaging the TSM rate, or playback rate, specified each time the segment was played. If the value of the parameter is "Overwrite", only the last TSM rate, or playback rate, specified for the repeated segment is used for the repeated segment in the Speed Contour.

2. Log_Repeats: this parameter is a Boolean variable which, if true, directs Speed Contour Generator 500 to record TSM rates each time a section of the input audio or audio-visual work is played by the user. The TSM rate, or playback rate, is stored each time the segment is played.

The parameters Average_or_Overwrite and Log_Repeats can be set as predetermined parameters for embodiment 1000 in accordance with methods which are well known to those of ordinary skill in the art or they can be entered and/or varied by receiving user input through UI 100 in accordance with methods which are well known to those of ordinary skill in the art. However, the manner in which these parameters are set and/or varied are not shown for ease of understanding the present invention.

As shown in FIG. 2, segment location and TSM rate are applied as input to box 1500. At box 1500, a search is performed to locate any records in the database that contain identical segment location values. Control is then transferred to box 1510. At box 1510 a decision is made. If a record containing identical segment location information is found, the record is noted and control is transferred to box 1520. If no such record is found, control is transferred to box 1570.

At box 1570, a new record in the database is created and an internal variable Record_Count is updated to reflect the count of records in the database (The internal variable Record_Count is initialized to 0 at the start of generation of each new Speed Contour.). Then, control is transferred to box 1580. At box 1580, data values are stored in fields of the newly created record and control is transferred to box 1550.

At box 1520 a decision is made. If a parameter Log_Repeats is true, control is transferred to box 1570, and if the parameter Log_Repeats is false, control is transferred to box 1530. At box 1530 a decision is made. If the value of parameter Average_or_Overwrite equals "Average" control is transferred to box 1540. If the value of parameter Average_or_Overwrite equals "Overwrite" control is transferred to box 1560.

At box 1540, data in fields TSM and Play_Cnt are replaced. As shown in FIG. 2, the previous value of Play_Cnt is used in computing a mathematical average of the TSM rates, and Play_Cnt is incremented. Then, control is transferred to box 1550. At box 1560, the data in fields TSM and Play_Cnt are replaced. As shown in FIG. 2, the current TSM rate overwrites the previous one and Play_Cnt is incremented. Then, control is transferred to box 1550.

At box 1550, the newly created or modified record is stored in the database. Control is then suspended until new data values arrive at Speed Contour 500, at which time control is transferred to box 1500. Upon completion of playback of an audio or audio-visual work, the database is scanned and the TSM rates, or playback rates, for each segment of the input signal are extracted and used to construct the Speed Contour. Note that when no segments are repeated and the work is played in its entirety, the Speed Contour is obtained by sorting the database records in ascending order according to their allocation order stored in the Rec data field. Note also that the Speed Contour may be stored for later use in accordance with any one of the many methods which are well known to those of ordinary skilled in the art to store such a digital stream of data. For example, the Speed Contour may be stored on Digital Storage Device 75, or on some other storage medium, or is transmitted to another system via a transmission device such as a modem.

Although FIG. 1 shows embodiment 1000 to be comprised of separate modules, in a preferred embodiment, UI 100, UIP/PC 200, TSM Subsystem 300, TSM Monitor 400, and Speed Contour Generator 500 are embodied as software programs or modules which run on a general purpose computer such as, for example, a personal computer. Furthermore, Digital Storage Device 75 is embodied as a disk drive or Random Access Memory and Digital to Analog Converter 600 is embodied as a typical accessory to a general purpose computer such as a soundcard on a personal computer. It should be well known to one of ordinary skill in the art, in light of the detailed description above, how to implement these programs or modules in software.

Figure 3:
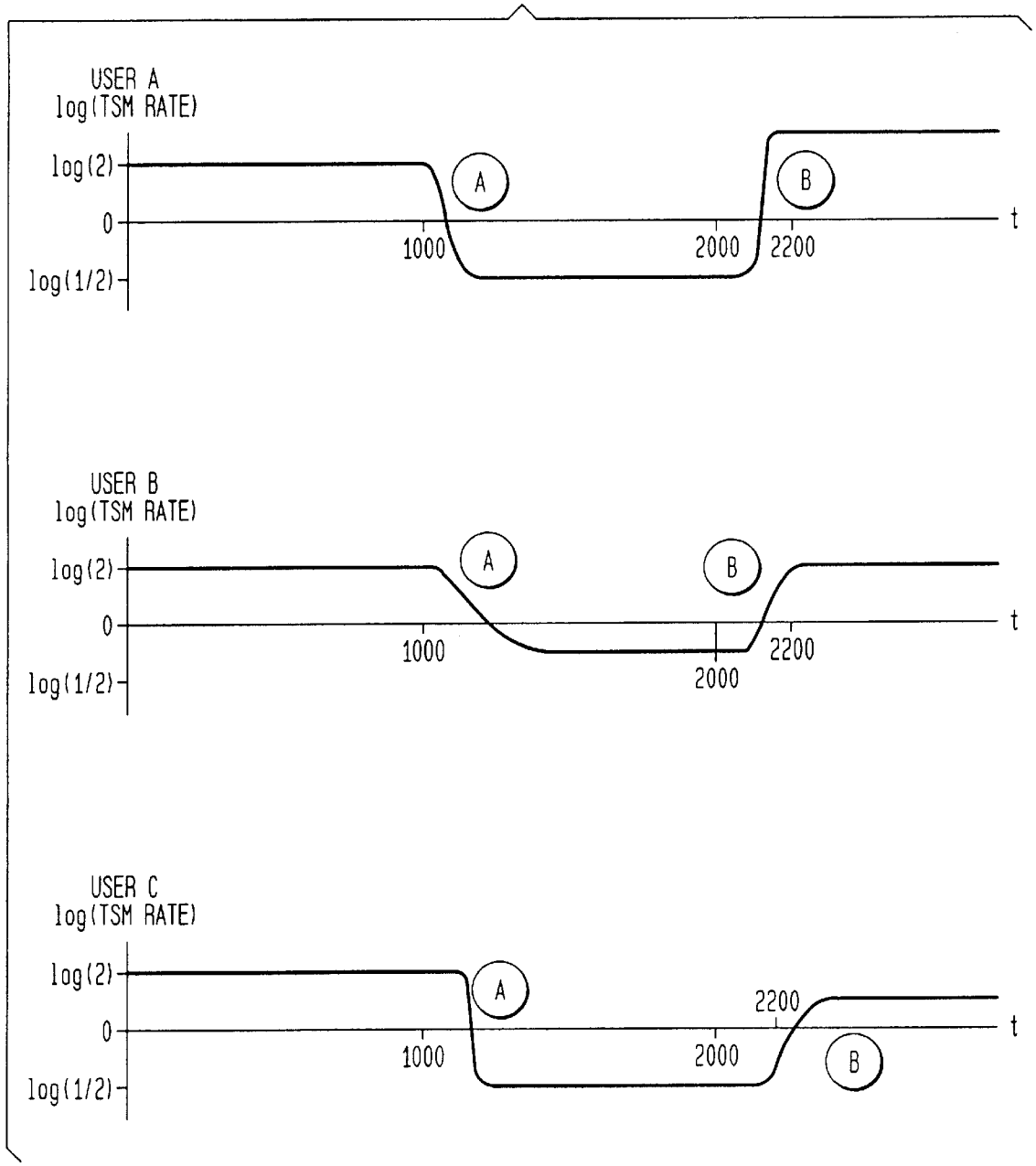
FIG. 3 shows, in graphical form, Speed Contours for several different listening sessions of the same audio or audio-visual work.

In accordance with one embodiment of the present invention, the data represented in a Speed Contour for a particular user can be presented in a graphical format to display the TSM rates, or playback rates, selected by a user or by groups of users to help identify similarities or differences. In one embodiment, TSM rate is displayed on the vertical axis of a two-dimensional graph and segment number or time-value is displayed on the horizontal axis. FIG. 3 shows, in graphical form, Speed Contours for several different listening sessions of the same audio or audio-visual work. Note that by displaying these Speed Contours in a graphical format, information about user interest, user comprehension, and user confusion can be inferred. For example, note that all three users slowed down the TSM rate, or playback rate, at segment 1000 (marked A in FIG. 3) and then sped up the TSM rate, or playback rate, at approximately the same segment 2200 (marked B in FIG. 3) in the audio or audio-visual work. From this it can be inferred that the users were more interested in the material being presented in the interval between segments 1000 and 2200, or that the complexity of the material changed in such a manner that the TSM rate, or playback rate, for the prior segments was too rapid for comfortable and complete comprehension of the subject matter in that interval. It should be well known to those of ordinary skill in the art how to provide a graphical display of Speed Contours which are stored in accordance with embodiment 1000 described above and how to store such Speed Contours for several users and/or for several sessions for the same user with associated identification information to enable retrieval of the information related to particular ones of the stored Speed Contours in accordance with methods that are well known to those of ordinary skill in the art.

Figure 4:
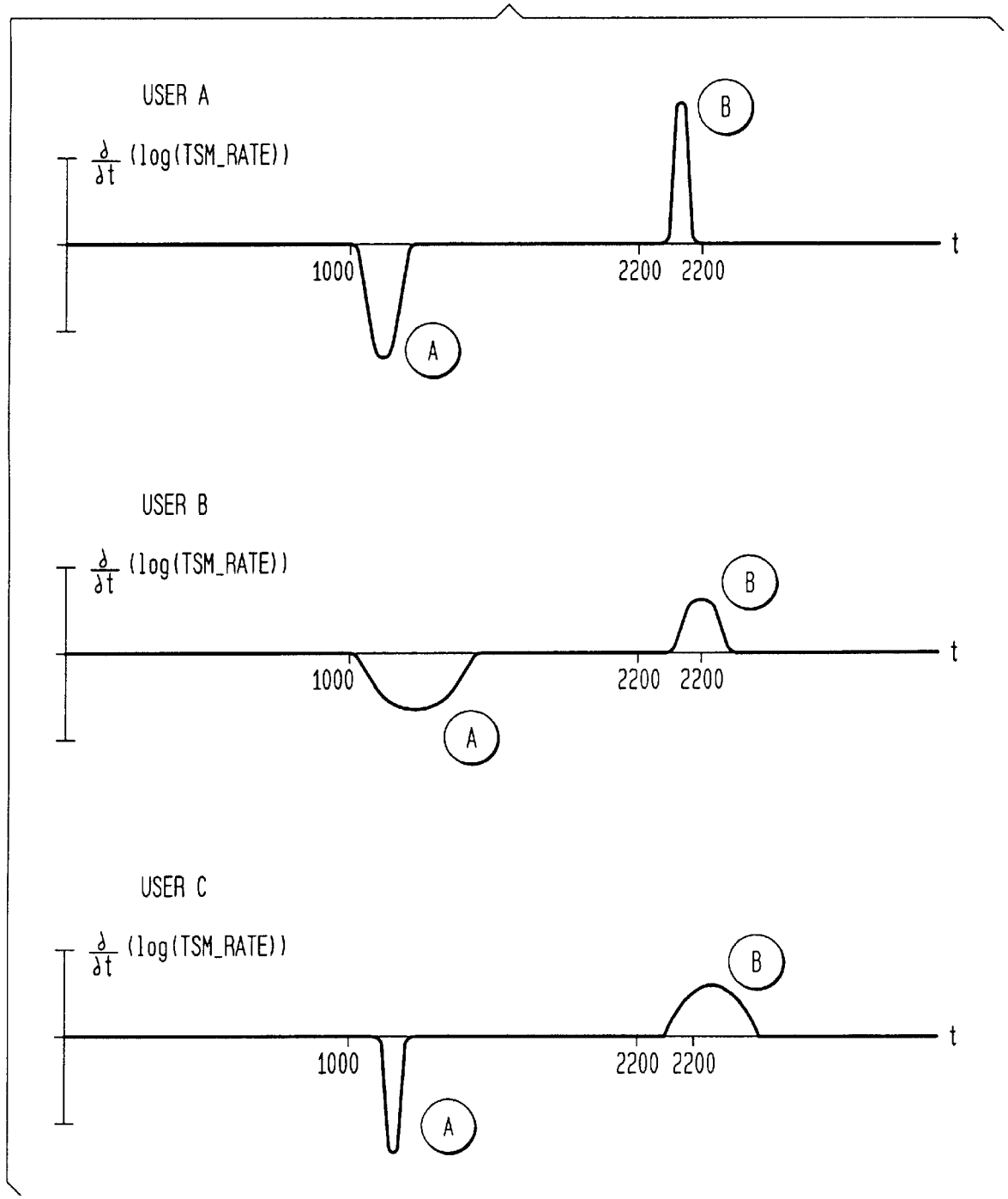
FIG. 4 shows, a graphical representation of Speed Contours produced using the first mathematical derivative of the TSM rate, or the playback rate, specified by the users for several different listening sessions of the same audio or audio-visual work.

An alternative embodiment of the present invention has identical components to those described above (and shown in FIG. 1) in conjunction with embodiment 1000 except for Speed Contour Generator 500. In this alternative embodiment of the present invention, Speed Contour Generator 500 outputs a "derivative" Speed Contour which comprises the derivative of the TSM rate, or playback rate, for each segment of the input audio or audio-visual work. FIG. 4 shows, a graphical representation of Speed Contours produced using the first mathematical derivative of the TSM rate, or the playback rate, specified by the users for several different listening sessions of the same audio or audio-visual work. In the two dimensional graphs shown in FIG. 4, the first derivative of the TSM rate is displayed on the vertical axis and time is displayed on the horizontal axis. The same data displayed in FIG. 3 was used to create the derivative Speed Contour for each user. As can be seen in FIG. 4, the derivative Speed Contour indicates changes in TSM rates, or playback rates, that are requested by users in a pronounced manner that is relatively easy to observe. Furthermore, one can readily appreciate that the derivative Speed Contour comprises less data than a Speed Contour since there are relatively few TSM rate, or playback rate, changes, and only segments associated with non-zero derivative TSM rates need be stored. It should be clear to those of ordinary skill in the art how to modify the algorithm illustrated in FIG. 2 to determine a derivative Speed Contour using methods which are well known to those of ordinary skill in the art or to derive a Derivative Speed Contour from a Speed Contour.

The term Average Speed Contour refers to a Speed Contour obtained for a particular audio or audio-visual work by averaging several Speed Contours generated by use of an embodiment of the present invention, for example, embodiment 1000 described in detail above, when a particular user listens to the audio or audio-visual passage several times. The value of the TSM rate, or playback rate, for a particular segment of the Average Speed Contour is obtained by computing the mathematical average of the TSM rate, or playback rate, in each of the several Speed Contours for the corresponding segment of the audio or audio-visual work. It should be well known to those of ordinary skill in the art how to store Speed Contours which are generated in accordance with embodiment 1000 described above for several users and/or for several sessions for the same user with associated identification information to provide retrieval of the information related to particular ones of the stored Speed Contours in accordance with methods that are well known to those of ordinary skill in the art. Furthermore, it should be well known to those of ordinary skill in the art how to compute an Average Speed Contour from any number of stored Speed Contours. One use of the Average Speed Contour is by those producing commercial or informational audio or audio-visual works in which information, for example a telephone number, will be transcribed by listeners. To determine an optimal information delivery rate which best enables the listener to successfully transcribe the desired information, one would generate an Average Contour using Speed Contours generated by a representative user in the projected audience. Another use of the Average Speed Contour is by those desiring to provide information at a maximum delivery rate for an audio or audio-visual work, which maximum delivery rate will enable listeners to comprehend the information being delivered. For example, those producing commercials would use a rapid speaking rate, or information delivery rate, to convey as much information as possible in a given time-slot. A listener using the embodiment of the present invention could reduce the TSM rate over segments of the audio or audio-visual work in which the speaking rate was too rapid for the listener's comprehension or intelligibility.

The term Democratic Speed Contour refers to a Speed Contour obtained for a particular audio or audio-visual work by averaging several Speed Contours or several Average Speed Contours obtained from different users while listening to that particular audio or audio-visual work. The value of the TSM rate, or playback rate, for a particular segment of the Democratic Speed Contour is obtained by computing the mathematical average of the TSM rate, or playback rate, in each of the several Speed Contours (each, for example, from a different listener) for the corresponding segment of the audio or audio-visual work. It should be well known to those of ordinary skill in the art how to store Speed Contours which are generated in accordance with embodiment 1000 described above for several users and/or for several sessions for the same user with associated identification information to provide retrieval of the information related to particular ones of the stored Speed Contours in accordance with methods that are well known to those of ordinary skill in the art. One use of the Democratic Speed Contour is by persons delivering information. To determine an optimal information delivery rate which best enables a particular demographic group of listeners to utilize the information, one would generate a Democratic Contour using Speed Contours generated by members of the particular demographic group of listeners. For example, the embodiment may be used to provide a Democratic Contour that takes advantage of the fact that listeners from one part of a country require a slower information delivery rate when listening to a speaker with an accent from another part of the country. In another use of a Democratic Contour, information about a particular demographic listener group is obtained, for example, by questionnaire. Then, target audiences are selected on the basis of responses to the questionnaire. For example, a group may be subdivided into a sub-group of listeners who use a personal computer at work and a sub-group of listeners who do not. Then an optimal information delivery rate regarding a computer software product is obtained from a Democratic Speed Contour generated by each sub-group. In this way, the optimal information delivery rate of a commercial or an informational audio or audio-visual work may be obtained for a particular demographic groups of listeners.

Figure 5:
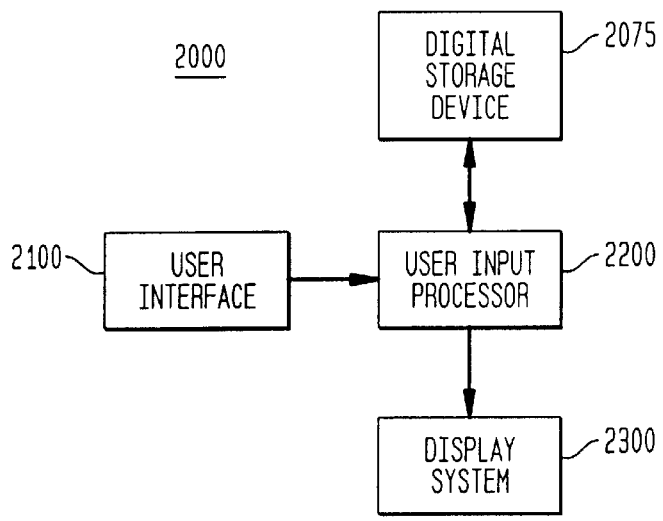
FIG. 5 shows a block diagram of an embodiment of a second aspect of the present invention which generates a Speed Contour for an audio or audio-visual work wherein user input and a word map of an audio or audio-visual work are used to provide a Speed Contour.

FIG. 5 shows a block diagram of embodiment 2000 of a second aspect of the present invention which generates a Speed Contour for an audio or audio-visual work wherein user input and a word map of an audio or audio-visual work are used to provide a Speed Contour. In such embodiments, the Speed Contour can be created even without having the user listen to the audio or the audio portion of the audio-visual work. In accordance with the second aspect of the present invention, rather than sampling TSM rates, or playback rates, as was described above in conjunction with the first aspect of the present invention, the Speed Contour is obtained using an editor which displays and manipulates the Speed Contour in response to user input.

As shown in FIG. 5, embodiment 2000 comprises User Interface 2100 ("UI 2100") which receives input from a user. There exist many apparatus which are well known to those of ordinary skill in the art for receiving input from a user. For example, it is well known to those of ordinary skill in the art that commercially available equipment exists for detecting: (a) the pressing of a key; (b) the activation of a switch on a mouse; (c) the movement of a slider or position indicator; and (d) user speech commands and, in response, for sending digital data representing the keypress, the switch activation, the movement of the slider or position indicator, or the speech commands to a central processing unit.

Figure 6:
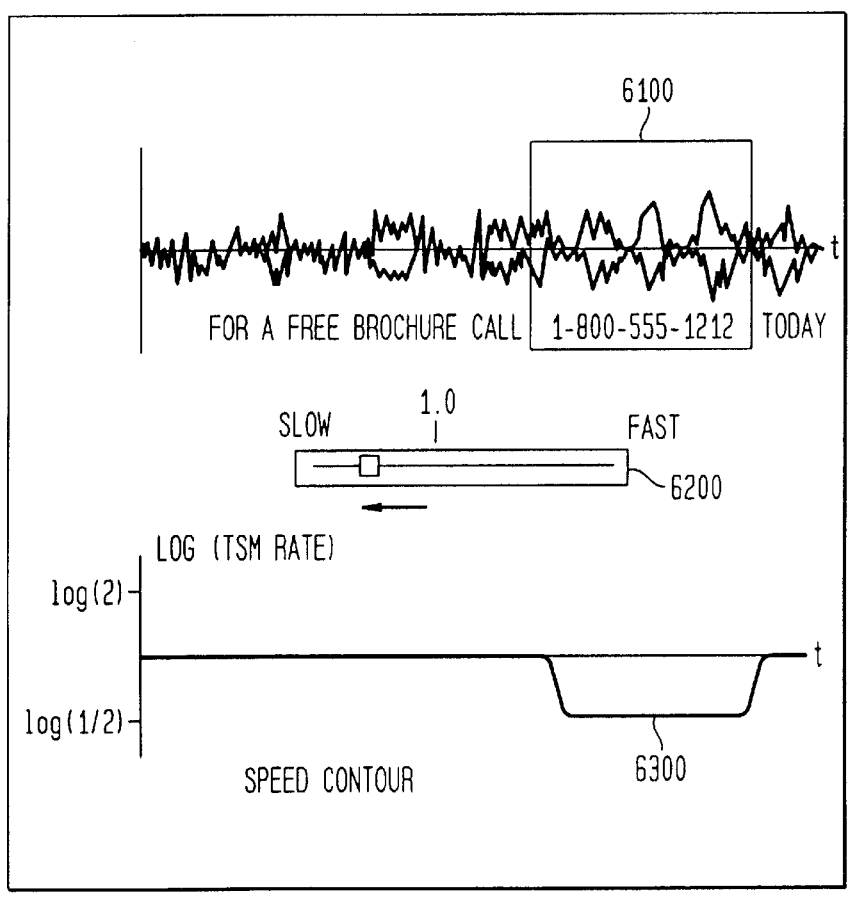
FIG. 6 shows, in graphical form, a two dimensional graph that displays a speech waveform and corresponding text for an audio or audio-visual work.

As is further shown in FIG. 5, embodiment 2000 comprises User Input Processor 2200 ("UIP 2200") which receives user input from UI 2100 and data or signals from an input audio or audio-visual work that is stored on Digital Storage Device 2075. In response, UIP 2200 generates and outputs data to produce a two dimensional graph, for example, with: (a) time and possibly text or phonetic words, displayed on the horizontal axis and (b) TSM rates displayed on the vertical axis. Graphical Display 2300 receives as input from UIP 2200, data which provide a graphical screen display image. In response, Graphical Display 2300 displays a two dimensional representation of an input audio or audio-visual work with text or phonetic labels. For example, it is well known to those of ordinary skill in the art that text and/or phonetic information may be displayed as an overlay on top of a graphical representation of a speech waveform on a computer screen. Then, in accordance with embodiment 2000, the user can highlight regions of the text displayed on Graphical Display 2300 using, for example a cursor under the control of UI 2100 to identify specific portions of the input audio or audio-visual work that are associated with the highlighted text. Next, using UI 2100 in a manner that is well known to those of ordinary skill in the art, the user selects and/or specifies a TSM rate, or playback rate, for the specific portion of the input audio or audio-visual work associated with the highlighted text. In another embodiment of this second aspect of the present invention, UIP 2200 comprises a text editor that displays a transcript of an audio work or the audio portion of an audio-visual work. In response, using UI 2100 in a manner that is well known to those of ordinary skill in the art, the user selects regions of text and selects and/or specifies a TSM rate, or playback rate, for the selected regions of text. Next, samples or segments of the input audio or audio-visual work that correspond to boundaries of the selected regions of text are determined and used to construct the Speed Contour. FIG. 6 shows, in graphical form, a two dimensional graph that displays a speech waveform and corresponding text for an audio or audio-visual work. As shown in FIG. 6, the user has highlighted region 6100 of the input audio or audio-visual work which contains a telephone number. The user then used slider bar 6200 to indicate the desired TSM rate for the selected region of the input audio or audio-visual work. Lastly, FIG. 6 shows Speed Contour 6300 that is generated on the basis of TSM rates requested by the user. FIG. 7 shows a display of a transcript of an audio or audio visual work. As shown in FIG. 7, the user has highlighted region 7100 of the transcript of the input audio or audio-visual work which contains a telephone number.

UIP 2200 constructs a Speed Contour using the same method (or a method similar to the method) described above for Speed Contour 500 (in conjunction with FIG. 2). Lastly, UIP 2200 stores the Speed Contour, for example, on Digital Storage Device 2075 or on some other storage medium or transmits the Speed Contour to another system via a transmission device such as a modem.

Although FIG. 5 shows embodiment 1000 to be comprised of separate modules, in a preferred embodiment, UI 2100 and UIP 2200 are embodied as software programs or modules which run on a general purpose computer such as, for example, a personal computer. Furthermore, Digital Storage Device 2075 is embodied as a disk drive or Random Access Memory. It should be well known to one of ordinary skill in the art, in light of the detailed description above, how to implement these programs or modules in software. Further, the audio or audio visual work may be stored in analog form on Digital Storage Device 2075 and translated to digital form in accordance with many methods that are well known to those of ordinary skill in the art.

In accordance with the first and second aspects of the present invention described above, a Speed Contour is temporal in nature, i.e., a TSM rate, or playback rate, is associated with each time interval of an audio or audio-visual work. This characterization of the Speed Contour requires some sort of preview of the audio or audio-visual work, either by the listener or an editor to determine the Speed Contour for the work. To eliminate this, in an embodiment of a third aspect of the present invention, a Conceptual Speed Association data structure ("CSA" data structure) is generated for use in creating an LIF work. A CSA data structure is, for example, a series of pairings of lists of Concept identifiers and lists of Speed Value identifiers. The CSA data structure is stored as a list of these pairs of sub-lists.

A Concept identifier comprises a keyword, a string of words, or a phrase that expresses a concept such as "stock market," "wall street," and "financial." These Concept identifiers are paired with Speed Value identifiers that represent a TSM rate, or playback rate, desired by a user while listening to an audio or audio-visual work which contains the Concept identifiers.

Embodiments of the third aspect of the present invention utilize detection apparatus that detects conceptual information in a particular portion of an audio or audio-visual work, and retrieval apparatus that uses the conceptual information to retrieve TSM rate, or playback rate, information from the CSA data structure, which retrieved information is used to determine the TSM rate, or playback rate, to be utilized for the particular portion. In accordance with one embodiment of the present invention, the detection apparatus comprises speech recognition equipment which is well known to those of ordinary skill in the art. In accordance with another embodiment of the present invention, the detection apparatus comprises apparatus which detects conceptual information contained within closed captioning information which accompanies many TV broadcasts or is available on, for example, movie tapes. Such detection apparatus for detecting closed captioning information is well known to those of ordinary skill in the art.

Figure 8:
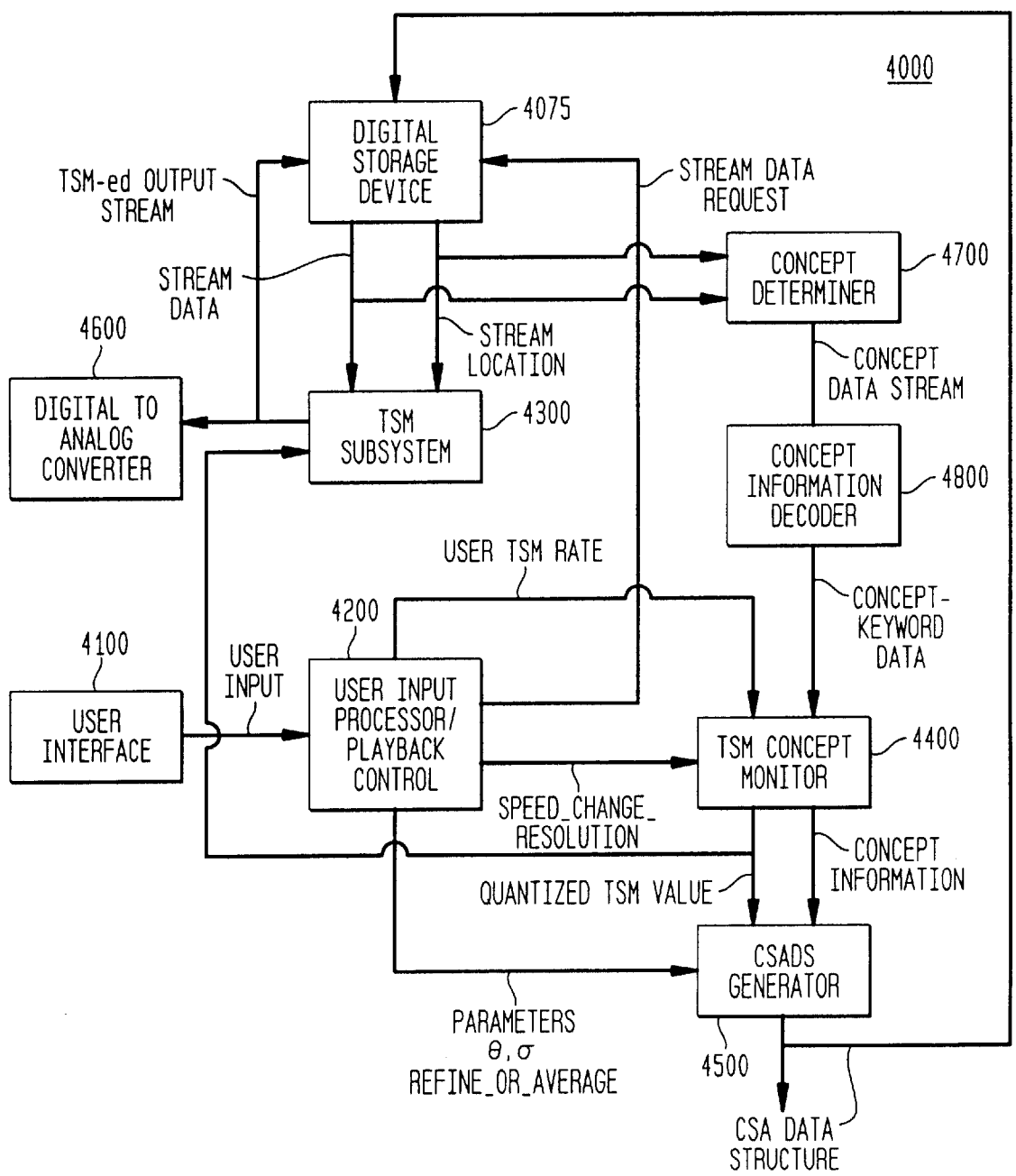
FIG. 8 shows a block diagram of an embodiment of a third aspect of the present invention which generates a Conceptual Speed Association data structure ("CSA" data structure") for an audio or audio-visual work.

FIG. 8 shows a block diagram of embodiment 4000 of a third aspect of the present invention which generates a CSA data structure for an audio or audio-visual work. As shown in FIG. 8, embodiment 4000 comprises User Interface 4100 ("UI 4100") which receives input from a user. An embodiment of UI 4100 is the same as UI 100 described above with respect to FIG. 1. UI 4100 provides output signals which indicate input from the user. The user input is interpreted by User Input Processor/Playback Control 4200 ("UIP/PC 4200") to indicate the following options selected by the user: (a) select a file to play, which file corresponds to a particular audio or audio-visual work (the selected file can be input to embodiment 4000 directly or it can be a file that has been stored by embodiment 4000); (b) initiate playback of the selected file; (c) halt playback of the selected file; (d) pause playback of the selected file; (e) modify the TSM rate, or playback rate, of a portion of the audio or audio-visual work being played; or (f) specify parameters Refine_or_ Average, Theta, and Sigma that are used by the apparatus in a manner that will be explained in detail below in generating a CSA data structure.

UIP/PC 4200 receives input from UI 4100 and (a) converts the user input to numeric values; (b) interprets the user input to set the values of parameters and to control the creation, use, modification or overriding of the CSA data structure; and (c) directs accessing and loading of a data stream from an audio or audio-visual work by sending stream data requests to Digital Storage Device 4075 (to perform playback control). In the case of Digital Storage Device 4075, UIP/PC 4200 may request access to a file of digital data representing an audio or audio-visual work stored in a file-system on the device. To direct accessing and loading of a data stream from an audio or audio-visual work, UIP/PC 4200 interprets the user input and the location of digital samples representing the audio or audio-visual work stored on Digital Storage Device 4075 to compute playback positions for the selected file at a particular sample.

Digital Storage Device 4075 receives the following as input: (a) stream data requests from UIP/PC 4200; and optionally (b) Time-Scale Modified output from TSM Subsystem 4300; and optionally (c) a stream of data representing the CSA data structure from CSA Data Structure Generator 4500 ("CSADS Generator 4500"). Digital Storage Device 4075 produces the following as output: (a) a stream of data representing an audio or audio-visual work; and (b) a stream of location information, for example position in a file, of the data stream being output. There are many methods well known to those of ordinary skill in the art for utilizing digital storage devices, for example a "hard disk drive", to store and retrieve general purpose data.

The audio or audio-visual work is typically stored in digital form on Digital Storage Device 4075. An embodiment of Digital Storage Device 4075 is the same as Digital Storage Device 75 described above with respect to FIG. 1. Digital storage device 4075 receives data requests from UIP/PC 4200 in accordance with methods which are well known to those of ordinary skill in the art to provide a stream of digital samples representing the audio and/or audio-visual work. In alternative embodiments, the audio or audio-visual work is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 4300.

TSM Subsystem 4300 receives as input: (a) a stream of samples representing portions of the audio or audio-visual work from Digital Storage Device 4075; (b) stream location information from Digital Storage Device 4075 used to identify the position in the data stream of the samples being sent, for example, a sample count or time value; and (c) a desired TSM rate, or playback rate, from Time-Scale Modification Concept Monitor 4400 ("TSM Concept Monitor 4400"). Output from TSM Subsystem 4300 is applied as input to: (a) Digital to Analog Converter/Audio and/or Audio-Visual Playback Device 4600 ("DA/APD 4600") and, optionally, to (b) Digital Storage 4075 for storage of the Time-Scale Modified output, i.e. the LIF work, if desired. DA/APD 4600 is apparatus which is well known in the art for receiving digital samples and constructing an audio or audio-visual work. In accordance with the present invention, the output of TSM Subsystem 4300 is a stream of digital samples representing an audio or audio-visual work whose playback rate is supplied from TSM Concept Monitor 4400 to provide feedback to the user about his/her current TSM rate specification. The user listens to the Time-Scale Modified output and can change the TSM rate, or playback rate, by providing further input using UI 4100. Further, if the user wishes to speed up or slow down a portion of the audio or audio-visual work just played (or speed up or slow down other portions having a similar Concept identifier that have not yet been played), the user can provide input using UI 4100 to rewind the audio or audio-visual work to a desired portion and replay it again with a modified TSM, or playback rate (or specify the desired TSM rate, or playback rate, for the other portions). In this manner, the user determines a desired TSM rate, or playback rate, for each portion of the audio or audio-visual work. Embodiments of TSM Subsystem 4300 and DA/APD 4600 are the same as TSM Subsystem 300 and DA/APD 600 described above with respect to FIG. 1. As one of ordinary skill in the prior art can readily appreciate, whenever embodiment 4000 provides playback for an audio-visual work, TSM Subsystem 4300 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped.

Concept Determiner 4700 accepts as input different sets of data depending on certain options. In accordance with option 1, the input data comprises a stream of data representing text or concepts, for example, closed-captioning data or textual annotation, that is stored with the current segment of the input audio or audio-visual work being supplied to TSM Subsystem 4300. For the case of option 1, Concept Determiner 4700 passes the incoming stream of data representing text or concepts through as output to Concept Decoder 4800. In accordance with option 2, the input data comprises: (a) a stream of samples representing portions of the audio or audio-visual work from Digital Storage Device 4075 and (b) current stream location information from Digital Storage Device 4075 used to identify the position in the stream of the samples being sent, for example, a sample count or time value of the beginning of the group of samples transferred from Digital Storage Device 4075. For the case of option 2, Concept Determiner 4700 provides as output a stream of data representing concepts contained in the current portion of the audio or audio-visual work being supplied to TSM Subsystem 4300. The concepts and/or textual transcript of spoken passages are determined by extracting closed-captioning information from the audio or audio-visual work, or by use of speech recognition algorithms to obtain a stream of text from the input audio or audio-visual work. Many methods are well known to those of ordinary skill in the art for extracting closed-captioning information and many methods are well known to those of ordinary skill in the art for extracting text using speech recognition algorithms.

Concept Information Decoder 4800 accepts as input from Concept Determiner 4700 a stream of data which represents conceptual information. In accordance with the present invention, and without limitation, the conceptual information comprises: written transcript, raw text, keywords, phrases, or other representations of conceptual information which are well known to those of ordinary skill in the art. In response, Concept Information Decoder 4800 generates as output a stream of data representing keywords and concepts for the current portion of the input audio or audio-visual work being sent to TSM Subsystem 4300.

Concept Information Decoder 4800 processes the input to form concept data representations of the input data stream. For example, Concept Information Decoder 4800 may simply remove articles and adjectives from input which represents a transcript to provide output comprised only of nouns and noun phrases. Alternatively, Concept Information Decoder 4800 may employ natural language processing to extract conceptual content from a stream of spoken words. Many methods of implementing Concept Information Decoder 4800 are well known to those of ordinary skill in the art. For example, there exist many systems which utilize techniques known as clustering to develop data sets of multidimensional vectors in which each element of a vector represents a particular property or value associated with attributes of the overall data set. Clustering allows for the classification and grouping of concepts based on the N-dimensional Euclidean distance between vectors. It is often the case that objects in a clustered data set may not belong explicitly to any one cluster in which case the object could be associated with more than one cluster. In such situations the Euclidean distance may be used to represent the probability that an object is a member of each possible cluster. See for example, a Ph.D. Dissertation submitted to Mississippi State University, Mississippi by Rajeev Agarwal 1995 entitled "Semantic Feature Extraction from Technical Texts with Limited Human Intervention."

TSM Concept Monitor 4400 receives the following as input to guide embodiment 4000 in generating a CSA data structure: (a) user input that has been translated by UIP/PC 4200 to a desired TSM rate, or playback rate (which desired TSM rate, or playback rate, may indicate a change of TSM rate, or playback rate, for a portion of the input audio or audio-visual work being perceived); (b) data from Concept Information Decoder 4800 that represents concepts for the current portion of the input audio or audio-visual work being sent to TSM Subsystem 4300; and (c) the Speed_Change_Resolution parameter from UIP/PC 4200.

TSM Concept Monitor 4400 processes the conceptual information and the TSM rate, or playback rate, requested by the user and derives a single TSM rate for the concept presented at its input. For example, the concept which is output from Concept Information Decoder 4800 may remain unchanged for several seconds due to the fact that an input concept such as "financial markets" may represent several words or phrases in the audio or audio-visual work being played. Because of this, the user may request a number of TSM rates over the interval of the input audio or audio-visual work associated with a single concept. In accordance with the present invention, TSM Concept Monitor 4400 creates a single TSM rate for a concept by, for example, performing a mathematical average of the TSM rates over the interval of the input audio or audio-visual work associated with that single concept. For example, a weighted average which emphasizes the most recent TSM values obtained during the interval in which a particular concept was present at the input to TSM Concept Monitor 4400 could be used. It should be understood that these are merely examples of many different methods which could be used.

TSM Concept Monitor 4400 uses the parameter Speed_Change_Resolution to determine appropriate TSM rates to pass to TSM Subsystem 4300 and to CSADS Generator 4500. The TSM rate determined for a particular concept is converted to one of the quantized levels in a manner which is well known to those of ordinary skill in the art. This means that the output TSM rate, or playback rate, can change only if the input desired TSM rate changes by an amount that exceeds the difference between quantized levels, i.e., Speed_Change_Resolution and the number of possible TSM rates is limited for efficient representation in data structures. The Speed_Change_Resolution parameter can be set as a predetermined parameter for embodiment 4000 in accordance with methods which are well known to those of ordinary skill in the art or they can be entered and/or varied by receiving user input through UI 4100 in accordance with methods which are well known to those of ordinary skill in the art. However, the manner in which these parameters are set and/or varied are not shown for ease of understanding the present invention.

TSM Concept Monitor 4400 produces as output: (a) a single TSM rate value and (b) concept information. The TSM rate is applied as input to TSM Subsystem 4300 and Conceptual Speed Association Data Structure Generator 4500 ("CSADS Generator 4500") and the concept information is applied as input to CSADS Generator 4500. It should be clear to those of ordinary skill in the art that the following will describe an embodiment that utilizes an average to determine a single TSM rate for a concept only for ease of understanding the present invention. However, it should also be clear that embodiments of the present invention are not limited to any one algorithm for determining a TSM rate to associate with a concept and that embodiments of the present invention are not limited to associating a single TSM rate with a concept. For example, the TSM rate associated with a concept can change, for example, to speed up during a replay to reflect the fact that the listener becomes more familiar with the concept and does not need as much time to comprehend the information as the concept is repeated during replay of the work.

CSADS Generator 4500 accepts the following as input from TSM Concept Monitor 4400: (a) concept information; (b) the TSM rate, or playback rate, for that concept; and (c) parameters (Refine_or_Average, Theta, and Sigma) values from UIP/PC 4200 used to control the process which creates the CSA data structure. Many methods are well known to those of ordinary skill in the art for implementing this data structure.

For example, the CSA data structure may be implemented as a series of related keywords phrases, or concepts followed by the appropriate TSM value.

(("stock", "bonds", "stock market", "wall street", "currency") 0.8)

(("Hollywood", "actor", "movie") 1.5)

where the TSM rate for the first group of concepts is 0.8 and the TSM rate for the second group of concepts is 1.5. Note that this data structure represents the desire of the listener to hear information about stock market and other financial concepts at a reduced playback rate (0.8) and specifies that information about Hollywood movies and actors should be presented at a more rapid playback rate (1.5 normal playback rate).

Figure 9:
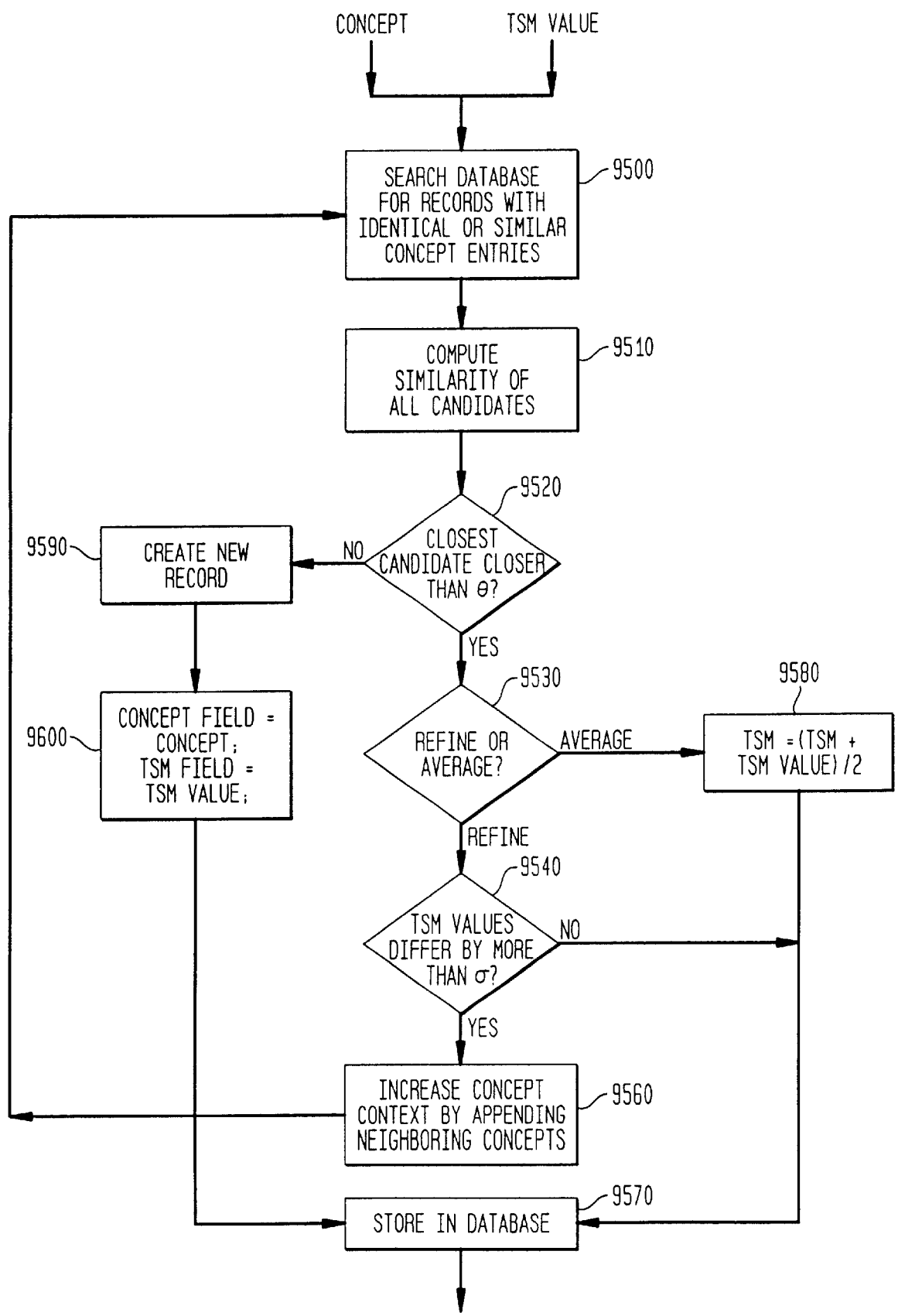
FIG. 9 shows a flowchart of an algorithm used in one embodiment of a CSADS Generator shown in FIG. 8 to generate a CSA data structure.

CSADS Generator 4500 uses a database or scratch-pad memory to maintain a list of records in which each record stores information pertaining to concepts and TSM Rates associated with those concepts. FIG. 9 shows a flowchart of an algorithm used in one embodiment of CSADS Generator 4500 to generate the CSA data structure.

As shown in FIG. 9, concept information and TSM rate are applied as input to box 9500. At box 9500, a search is performed to locate any records in a database that contain identical or similar concept information; then, control is transferred to box 9510. At box 9510, a numeric value is determined that reflects the similarity of the list of potential matches for the concept, if any, that were found at box 9500. A conceptual distance between two words or data values representing concepts can calculated using any number of methods known to those skilled in the arts. For example, in the simplest form a list of synonyms or other reference data may be employed for computing the distance. In another method a Euclidean distance may be used to gauge the similarity of multi-dimensional vector objects in a data set which employs clustering algorithms to classify concepts. In still another method, a "head-driven phrase structured grammar" is commonly used to parse sentences and word phrases for meaning. Control is then transferred to box 9520.

At box 9520, a decision is made to determine if the record with the closest match is within an amount given by a parameter Theta. If the closest match is within the amount given by Theta, control is transferred to box 9530, otherwise control is transferred to box 9590.

At box 9530, a decision is made to determine if a parameter Refine_or_Average is equal to "Refine" or "Average." If Refine_or_Average equals "Refine," control is transferred to box 9540. If Refine_or_Average equals "Average," control is transferred to box 9580.

At box 9580, the stored TSM value for a particular concept is updated by computing a mathematical average of the existing TSM value in the CSA data structure and the currently stored TSM rate. Control is then transferred to box 9570.

At box 9590, a new record in the database is created; then, control is transferred to box 9600. At box 9600, values in the CSA data structure are installed as follows: (a) the current concept is stored in the concept field and (b) the current TSM rate is stored in the TSM field. Control is then transferred to box 9570.

At box 9540, a decision is made which compares the difference between the TSM rate in the record with the closest match and the current TSM rate. If the difference is greater than a parameter Sigma, control is transferred to box 9560, otherwise control is transferred to box 9570. At box 9560, the current concept or keyword phrase is narrowed by appending previous concepts to the current concept in an attempt to further particularize and narrow the concept so that it is distinguished from existing concepts in the CSA data structure. For example, in one embodiment of the present invention, the concept or keyword "bond" may be included in the CSA data structure record corresponding to financial information, i.e., the concept field corresponding to financial information may comprise ("money", "stock", bond"). If the input audio or audio-visual work contained the phrase "actor James Bond" and the listener consistently speeds up playback during this phrase such that the TSM rate differs by more than Sigma from the value in the TSM field corresponding to the financial information concept field, then the concept or keyword "bond" would be prefixed with the existing concept or keyword, in this case "James." Then the database would be searched again using this new concept, "James Bond", as indicated by the transfer of control to box 9500. In accordance with this embodiment of the present invention, different entries are created for the keyword "bond." One entry would correspond to its use in the context of financial reports and another entry would correspond to its use when paired with the name "James." At box 9570, the newly created or updated record is stored in the database.

In a further embodiment of the present invention the CSA data structure may be generated without using embodiment 4000 described above. Instead, the CSA data structure may generated by entering the data into a structure using, for example, a text editor or by filling out a questionnaire about concepts that are of interest. This CSA data structure can be used create an LIF work from an audio or audio-visual work without having the user listen to it previously. In a similar manner, the CSA data structure can be constructed using keywords and phrases of the type that are typically presented to "on-line" search engines and used to control data retrieval.

A CSA data structure can also be used to control the playback rate of audio or audio-visual works retrieved by a search engine to create LIF works from previously unheard audio or audio-visual works that are retrieved by the search engine. In one such embodiment, the CSA data structure is obtained by use of user specified search criteria that was input to the search engine. For example, user input to a search engine requesting "all boats excluding yachts" would create LIF works that play information about boats at a normal rate but exclude or speed through items about yachts. In light the detailed description, it should be clear to those of ordinary skill in the art how to create a CSA data structure using information transferred from, for example, a search engine.

In a still further embodiment of the present invention, the CSA data structure may contain TSM rate entries, for example, of "infinity" for particular concepts or keywords. In this embodiment of the present invention, a TSM rate of "infinity" (or some other indicium that will be similarly translated) directs the playback system to skip sections of an audio or audio-visual work whose concept has a corresponding TSM rate of infinity. In accordance with this embodiment, users can specify "no interest" in particular concepts or keywords when listening to or searching audio or audio-visual works. For example a user may specify the following CSA data structure for use in listening to a nightly news broadcast:

(("weather", "partly cloudy", "weather forecast", "temperatures", "dew point")

("infinity")

(("stock", "bonds", "stock market", "wall street", "currency") 0.8)

(("Hollywood", "actor", "movie") 1.5)

This CSA data structure directs the playback to: (a) skip over weather forecasts and the reporting of temperatures during the broadcast; (b) playback financial information at 0.8 of the normal playback speed; and (c) speed through information regarding Hollywood movies, and actors by increasing the TSM rate to 1.5 times the normal playback rate.

Note that embodiments of the present invention are not limited to static CSA data structures, in that, as will be described below, a user may supply input during playback to refine the TSM rates. For example if the CSA data structure contained entries as follows:

(("stock", "bond", "stock market", "wall street", "currency") 0.8)

(("Hollywood", "actor", "movie") 1.5))

and the user consistently intervened to speed up the playback rate when the phrase "actor, James Bond" occurred in the input, as was explained above, embodiment 4000 of the present invention may make changes or refinements to the CSA data structure by adding a new entry so that the modified data structure would be:

(("stock", "bond", "stock market", "wall street", "currency") 0.8)

(("Hollywood", "actor", "movie") 1.5))

(("actor James Bond") 2.0)

In this manner, the CSA data structure can be continually refined to reflect the users interests while listening to new material and new concepts using an existing CSA data structure.

As one can readily appreciate, the use of a CSA data structure is not limited to TSM rates, and in fact, as was described above, the first derivative of the TSM rate may also be used to effect the same result. For example, if a user consistently slows down when hearing the words "free sample" then a CSA data structure which stores the TSM rate changes rather than the TSM rates themselves would be equally useful for controlling the playback speed during previously unheard material.

Although FIG. 8 shows embodiment 4000 to be comprised of separate modules, in a preferred embodiment, UI 4100, UIP/PC 4200, TSM Subsystem 4300, TSM Concept Monitor 4400, Concept Determiner 4700, Concept Information Decoder 4800, and CSADS Generator 4500 are embodied as software programs or modules which run on a general purpose computer such as, for example, a personal computer. Furthermore, Digital Storage Device 4075 is embodied as a disk drive or Random Access Memory and Digital to Analog Converter 4600 is embodied as a typical accessory to a general purpose computer such as a soundcard on a personal computer. It should be well known to one of ordinary skill in the art, in light of the detailed description above, how to implement these programs or modules in software.

Embodiment 4000 shown in FIG. 8 may be modified to convert a previously generated Speed Contour for a particular audio or audio-visual work to a CSA data structure for that work. In this modification, TSM rates are obtained from the Speed Contour (to replace User TSM Rate values output from the UIP/PC 4200) and provided as input to TSM Concept Monitor 4400. In light of the detailed discussion herein, it should be clear to those of ordinary skill in the art how to input the Speed Contour and obtain the TSM rates. Similarly, embodiment 1000 shown in FIG. 1 may be modified to convert a previously generated CSA data structure for a particular audio or audio-visual work to a Speed Contour for that work. In this modification, TSM rates are obtained from the CSA data structure (to replace User TSM Rate output from UIP/PC 200) and provided as input to TSM Monitor 400. The TSM rates are obtained from CSA data structure in accordance with embodiment 6000 (to be described in detail below), i.e., the TSM rates are output from TSM Concept Look-Up 6500 of embodiment 6000.

For ease of understanding, the embodiments described herein refer to TSM rates. However, the present invention is not so limited. It should be understood that embodiments of the present invention can use anything from which a TSM rate can be determined for use in fabricating or carrying out embodiments of the present invention, referred to herein as affinity information. For example, an indication of user interest or user information retrieval level could be used in place of TSM rate. Then, in order to provide a replay, a conversion is made between the user interest or user information retrieval level and the TSM rate. In such an embodiment, a conversion function would be used to map the user interest or user information retrieval levels to TSM rates. In some such embodiments, for example, the conversion function can be modified without changing the Speed Contour or CSA data structure.

For ease of understanding, the embodiments herein refer to a Speed Contour which makes a correspondence between TSM rate and associated temporal position and a CSA data structure which makes a correspondence between TSM rate and associated concept. However, the present invention is not so limited. It should be understood that embodiments of the present invention refer to a Speed Contour or a CSA data structure which makes a correspondence between anything from which a TSM rate can be determined and anything from which one or more portions of a work with which the TSM rate is associated can be identified.

Further, it should be understood that embodiments of the present invention refer to a Speed Contour or a CSA data structure wherein the identifier of the TSM rate and the identifier of the portion can have a functional dependence for determining the TSM rate to be used for a particular portion identifier. For example, in embodiments in which concepts are used to identify some portion of a work, the TSM rate associated with a particular concept could be computed as a function of the number of times a concept has appeared in a work so that the first playing of the concept uses a slower TSM rate and subsequent occurrences of the same concept are presented with increased TSM rates for faster playback.

Application of Speed Contours and Conceptual Speed Association Data Structures to Produce a Listener-Interest-Filtered Work In accordance with embodiments of a fourth aspect of the present invention, a Speed Contour is utilized in conjunction with an audio or audio-visual work to produce an LIF work wherein segments of the audio or audio-visual work are played back in accordance with TSM rates, or playback rates, specified by the Speed Contour. In addition, some of such embodiments also store the LIF work for later replay by the same embodiment or by other replay devices.

As one of ordinary skill in the prior art can readily appreciate, embodiments of the present invention which provide an LIF work for the audio portion of an audio-visual work can also speed up or slow down visual information to match the audio in the audio-visual works as well. To do this in a preferred embodiment, the audio is processed using TSM methods as described above and the video signal is "Frame-subsampled" or "Frame-replicated" in accordance with any one of the many methods known to those of ordinary skill in the prior art to achieve the desired TSM rate and to maintain synchronism between the audio and visual portions of the audio-visual work. Thus, if one speeds up the audio and samples are requested at a faster rate, the frame stream is subsampled, i.e. frames are skipped.

Figure 10:
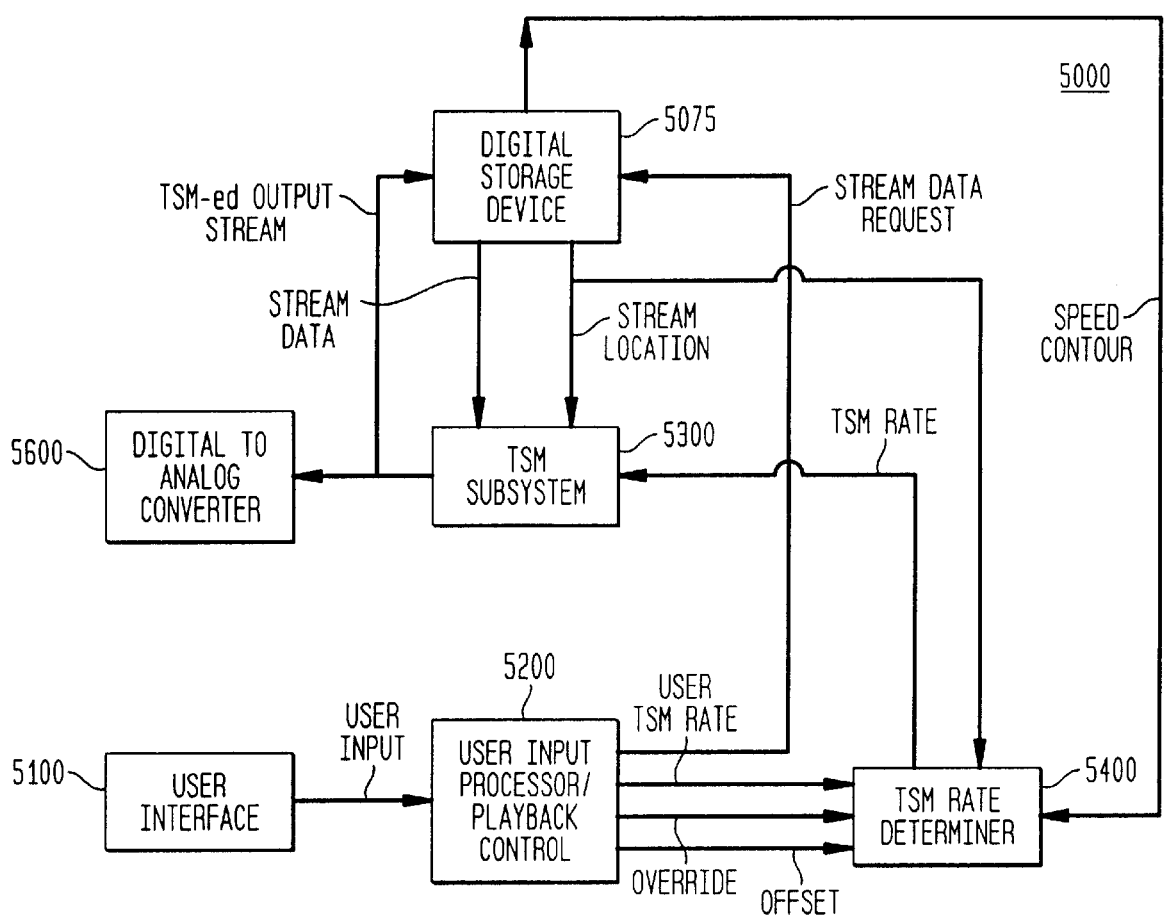
FIG. 10 shows a block diagram of an embodiment of a fourth aspect of the present invention which utilizes a Speed Contour in conjunction with an audio or audio-visual work to produce an LIF work.

FIG. 10 shows a block diagram of embodiment 5000 of the fourth aspect of the present invention which utilizes a Speed Contour in conjunction with an audio or audio-visual work to produce an LIF work. As shown in FIG. 10, embodiment 5000 comprises User Interface 5100 ("UI 5100") which receives input from a user. An embodiment of UI 5100 is the same as UI 100 described above with respect to FIG. 1. UI 5100 provides output signals which indicate input from the user. The user input is interpreted by User Input Processor 5200/Playback Control 5200 ("UIP/PC 5200") to indicate the following options selected by the user: (a) select a file to play, which file corresponds to a particular audio or audio-visual work (the selected file can be input to embodiment 5000 directly or it can be a file that has been stored by embodiment 5000); (b) select a Speed Contour to control the TSM rate, or playback rate; (c) initiate playback of the selected file; (d) halt playback of the selected file; (e) pause playback of the selected file; (f) modify or override the TSM rate, or playback rate, obtained from the Speed Contour for a portion of the audio or audio-visual work being played; or (g) specify parameters Offset and Override which are used by the apparatus in a manner that will be explained in detail below.

As shown in FIG. 10, UIP/PC 5200 receives the user input from UI 5100 and (a) converts the user input to numeric values; (b) interprets the user input to set the values of parameters and to control the use, modification or overriding of the Speed Contour; (c) directs accessing and loading of a data stream from an audio or audio-visual work by sending stream data requests to Digital Storage Device 5075 (to perform playback control); and (d) directs accessing and loading of a data stream from a Speed Contour by sending stream data requests to Digital Storage Device 5075. In the case of Digital Storage Device 5075, UIP/PC 5200 may request access to a file of digital data representing an audio or audio-visual work stored in a file-system on the device. To direct accessing and loading of a data stream from an audio or audio-visual work, UIP/PC 5200 interprets the user input and the location of digital samples representing the audio or audio-visual work stored on Digital Storage Device 5075 to compute playback positions for the selected file at a particular sample. In a preferred embodiment, the data requests for audio or audio-visual work and the data requests for the Speed Contour are issued such that data from the same temporal locations of each is provided as output from Digital Storage Device 5075.

Digital Storage Device 5075 receives the following as input: (a) stream data requests from UIP/PC 5200; and optionally (b) Time-Scale Modified output from TSM Subsystem 5300. Digital Storage Device 5075 produces the following as output: (a) a stream of data representing an audio or audio-visual work; (b) a stream of location information, for example position in a file, of the data stream being output; and (c) a stream of data representing the Speed Contour. There are many methods well known to those of ordinary skill in the art for utilizing digital storage devices, for example a "hard disk drive", to store and retrieve general purpose data.

The audio or audio-visual work is typically stored in digital form on Digital Storage Device 5075. An embodiment of Digital Storage Device 5075 is the same as Digital Storage Device 75 described above with respect to FIG. 1. Digital storage device 5075 is accessed by UIP/PC 5200 in accordance with methods which are well known to those of ordinary skill in the art to provide a stream of digital samples representing the audio and/or audio-visual work. In alternative embodiments, the audio or audio-visual work is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 5300.

TSM Rate Determiner 5400 receives as input: (a) a Speed Contour selected by the user which is applied as input from Digital Storage Device 5075; (b) a TSM rate specified by the user which is applied as input from UIP/PC 5200; (c) Offset, an offset TSM rate specified by the user which is applied as input from UIP/PC 5200; (d) Override, a Boolean parameter specified by the user which is applied as input from UIP/PC 5200; and (e) current stream location information from Digital Storage Device 5075 used to identify the position in the stream of the samples being sent, for example, a sample count or time value of the beginning of the group of samples transferred from Digital Storage Device 5075. In response, TSM Rate Determiner 5400 produces as output a TSM rate which is received by TSM Subsystem 5300.

TSM Rate Determiner 5400 uses the stream location information to select the closest corresponding temporal position in the Speed Contour in order to determine the associated TSM rate specified in the Speed Contour. This approach allows Speed Contours created with different Interval_Size values, or TSM sampling frequencies, to be used for any audio or audio-visual work, and insures a one-to-one temporal correspondence between data stream position and TSM rates obtained from the Speed Contour.

TSM Rate Determiner 5400 determines the output TSM rate, or playback rate, using any one of the following modes of operation:

1. Speed Contour Driven Playback: In this mode, the output of TSM Rate Determiner 5400 are TSM rates obtained from the Speed Contour for the corresponding portions of the input audio or audio-visual work to be played. This mode outputs TSM rates that are identical to those specified by the Speed Contour.
2. Speed Contour Offset Playback: In this mode, the user specifies, via UI 5100, Offset, an offset parameter that is used to adjust the TSM rates specified by the Speed Contour. In this mode, the TSM rate output is given by the following formula:

$$TSM\_rate = TSM \text{ rate from Speed Contour} * (1 + Offset)$$

For example, if a user specifies an offset factor of −0.4, TSM Rate Determiner 5400 will add the −0.4 offset value to the number 1.0 (resulting in the value 0.6) and scale each of the TSM rates specified in the Speed Contour to achieve a uniform decrease (slow down) in the TSM rate, or playback rate, for the output signal produced. Similarly a positive offset would increase (speed up) the TSM rate, or playback rate, for the output signal produced. Note that an offset value of zero has no effect on the TSM rate. As one can readily appreciate different offset strategies may be employed to achieve non-linear and linear scaling of the TSM rates.

3. User Override of Speed Contour: In this mode, the user can override the Speed Contour and manually control the TSM rate, or playback rate, over portions of the audio or audio-visual work. When the override is released by the user, the TSM rate used to determine the TSM rate, or playback rate, of the output signal is taken from the corresponding location in the Speed Contour.

As shown in FIG. 10, TSM Subsystem 5300 receives as input: (a) a stream of samples representing portions of the audio or audio-visual work from Digital Storage Device 5075; (b) stream location information from Digital Storage Device 5075 used to identify the position in the data stream of the samples being sent, for example, a sample count or time value; and (c) the TSM rate from TSM Rate Determiner 5400. As described above, the input can be an analog which is transformed into a series of digital samples in accordance with method and apparatus which are well known to those of ordinary skill in the art. Output from TSM Subsystem 5300 is applied as input to: (a) Digital to Analog Converter/Audio and/or Audio-Visual Playback Device 5600 ("DA/APD 5600") and, optionally, to (b) Digital Storage 5075 for storing the replay at the TSM rate if desired. DA/APD 600 is apparatus which is well known in the art for receiving digital samples and providing a replay of an audio or audio-visual work. The output from TSM apparatus 4300 is a stream of digital samples which comprise a digitized audio or audio-visual stream that is a Time-Scaled Modified version of the input audio or audio-visual work and, in accordance with the present invention, reflects the TSM rates, or playback rates, specified by the Speed Contour and/or user input. This output represents the LIF work.

In some embodiments, the LIF work is stored for later replay by the same embodiment or by other replay devices. In addition, the digital output can be transformed to analog form for storage on analog devices. There are many apparatus which are well known to those of ordinary skill in the art for receiving a digitized input signal, such as a 16-bit Pulse Code Modulation, and for providing an analog signal output therefrom. For example, it is well known to those of ordinary skill in the art that commercially available equipment exists for receiving a stream of digitized samples representing a signal and for converting those samples to an analog signal without loss of fidelity. Embodiments of TSM Subsystem 5300 and DA/APD 5600 are the same as TSM Subsystem 300 and DA/APD 600 described above with respect to FIG. 1. As one of ordinary skill in the prior art can readily appreciate, whenever embodiment 5000 provides playback for an audio-visual work, TSM Subsystem 5300 speeds up or slows down visual information to match the audio in the audio-visual work. To do this in a preferred embodiment, the video signal is "Frame-subsampled" or "Frame-replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped.

Although FIG. 10 shows embodiment 5000 to be comprised of separate modules, in a preferred embodiment, UI 5100, UIP/PC 5200, TSM Subsystem 5300, and TSM Rate Determiner 5400 are embodied as software programs or modules which run on a general purpose computer such as, for example, a personal computer. Furthermore, Digital Storage Device 5075 is embodied as a disk drive or Random Access Memory and Digital to Analog Converter 5600 is embodied as a typical accessory to a general purpose computer such as a soundcard on a personal computer. It should be well known to one of ordinary skill in the art, in light of the detailed description above, how to implement these programs or modules in software.

As one can readily appreciate, in the absence of user input the time-scale of a LIF work is fully determined by the Speed Contour. Furthermore the data fetch rate of the input signal is also determined by the Speed Contour: higher rates are required for speed-up, slower rates for slow-down. Since the Speed Contour has a temporal correspondence with the input signal, the data fetch rate, or read-rate, for the Speed Contour is identical to that of the input signal. In many embodiments, it is desirable to reduce the number of devices with variable read rates. In accordance with the present invention, variable read rates can be eliminated in the following manner.

The data contained in the Speed Contour will be read at the rate specified by the previous values of the Speed Contour. By performing a time-scale modification of the input Speed Contour using the Speed Contour itself, a new Speed Contour is obtained. This Time-Scale Modified Speed Contour will share a temporal correspondence with the output signal created by applying the original Speed Contour to the input signal. Because the output is generated at a fixed rate regardless of the time-scale modification performed, the Time-Scale Modified Speed Contour values will be accessed at a fixed rate.

In accordance with embodiments of a fifth aspect of the present invention, a CSA data structure is utilized in conjunction with an audio or audio-visual work to produce an LIF work wherein portions of the audio or audio-visual work are played back in accordance with TSM rates, or playback rates, specified by the CSA data structure. In addition, some of such embodiments also store the LIF work for later replay by the same embodiment or by other replay devices.

Figure 11:
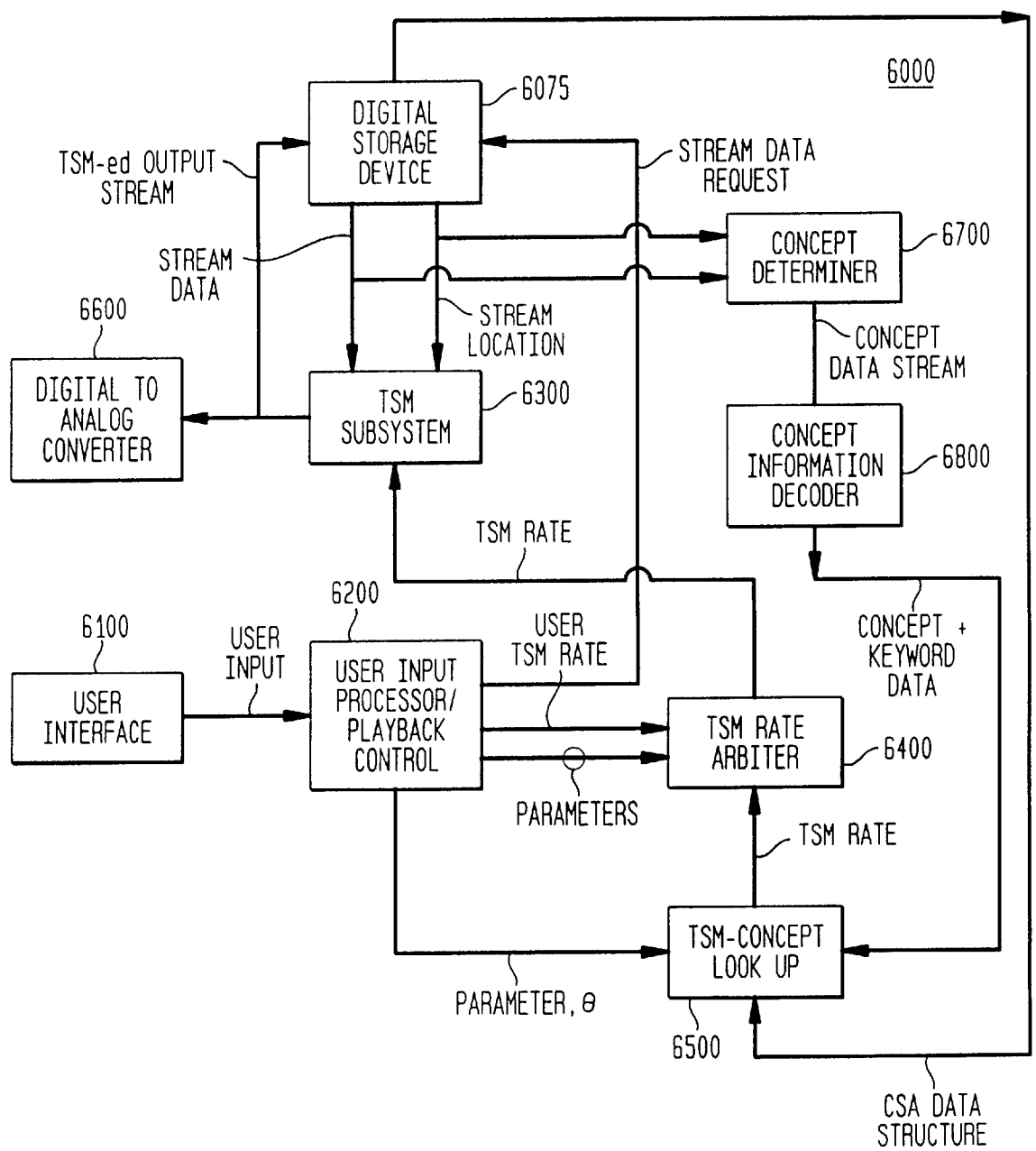
FIG. 11 shows a block diagram of an embodiment of a fifth aspect of the present invention which utilizes a CSA data structure in conjunction with an audio or audio-visual work to produce an LIF work.

FIG. 11 shows a block diagram of embodiment 6000 of the fifth aspect of the present invention which utilizes a CSA data structure in conjunction with an audio or audio-visual work to produce an LIF work. As shown in FIG. 11, embodiment 6000 comprises User Interface 6100 ("UI 6100") which receives input from a user. An embodiment of UI 6100 is the same as UI 100 described above with respect to FIG. 1. UI 6100 provides output signals which indicate input from the user. The user input is interpreted by User Input Processor 6200/Playback Control ("UIP/PC 6200") to indicate the following options selected by the user: (a) select a file to play, which file corresponds to a particular audio or audio-visual work (the selected file can be input to embodiment 6000 directly or it can be a file that has been stored by embodiment 6000); (b) select a CSA data structure to control the TSM rate, or playback rate; (c) initiate playback of the selected file; (d) halt playback of the selected file; (e) pause playback of the selected file; (f) modify or override the TSM rate, or playback rate, obtained from the CSA data structure for a portion of the audio or audio-visual work being played; or (g) to specify parameters Theta, Offset, Slew-Limit, and Override that are used by the apparatus in a manner that will be explained in detail below. In addition, embodiment can also receive an audio or audio-visual work that is input directly from, for example, TV. In that case, the audio portion is converted to digital format in the manner described above for analog input, and the close-captioning information, if any, can also be converted to an appropriate digital format in accordance with any one or the many methods which are well known to those of ordinary skill in the art.

As shown in FIG. 11, UIP/PC 6200 receives input from UI 6100 and (a) converts the user input to numeric values; (b) interprets the user input to set the values of parameters and to control the use, modification or overriding of the TSM rates from the CSA data structure; and (c) directs accessing and loading of a data stream from an audio or audio-visual work by sending stream data requests to Digital Storage Device 5075 (to perform playback control). In the case of Digital Storage Device 6075, UIP/PC 6200 may request access to a file of digital data representing an audio or audio-visual work stored in a file-system on the device. To direct accessing and loading of a data stream from an audio or audio-visual work, UIP/PC 6200 interprets the user input and the location of digital samples representing the audio or audio-visual work stored on Digital Storage Device 6075 to compute playback positions for the selected file at a particular sample.

Digital Storage Device 6075 receives the following as input: (a) stream data requests from UIP/PC 5200; and optionally (b) Time-Scale Modified output from TSM Subsystem 5300. Digital Storage Device 5075 produces the following as output: (a) a stream of data representing an audio or audio-visual work; (b) a stream of location information, for example position in a file, of the data stream being output; and (c) a stream of data representing the CSA data structure. There are many methods well known to those of ordinary skill in the art for utilizing digital storage devices, for example a "hard disk drive", to store and retrieve general purpose data.

The audio or audio-visual work is typically stored in digital form on Digital Storage Device 6075. An embodiment of Digital Storage Device 6075 is the same as Digital Storage Device 75 described above with respect to FIG. 1. Digital storage device 6075 is accessed by UIP/PC 6200 in accordance with methods which are well known to those of ordinary skill in the art to provide a stream of digital samples representing the audio and/or audio-visual work. In alternative embodiments, the audio or audio-visual work is stored in analog form on an analog storage device. In such an alternative embodiment, a stream of analog signals is input to an apparatus, not shown, for transforming the analog samples into digital samples. There exist many commercially available apparatus which are well known to those of ordinary skill in the art for receiving an input analog signal such as a voice signal and for sampling the analog signal at a rate which is at least the Nyquist rate to provide a stream of digital signals which may be converted back into an analog signal without loss of fidelity. The digital samples are then transmitted to TSM Subsystem 6300.

Concept Determiner 6700 accepts as input different sets of data depending on certain options. In accordance with option 1, the input data comprises a stream of data representing text or concepts, for example, closed-captioning data or textual annotation, that is stored with the current segment of the input audio or audio-visual work being supplied to TSM Subsystem 6300. For the case of option 1, Concept Determiner 6700 passes the incoming stream of data representing text or concepts through as output to Concept Decoder 6800. In accordance with option 2, the input data comprises: (a) a stream of samples representing portions of the audio or audio-visual work from Digital Storage Device 6075 and (b) current stream location information from Digital Storage Device 6075 used to identify the position in the stream of the samples being sent, for example, a sample count or time value of the beginning of the group of samples transferred from Digital Storage Device 6075. For the case of option 2, Concept Determiner 6700 provides as output a stream of data representing concepts contained in the current portion of the audio or audio-visual work being supplied to TSM Subsystem 6300. The concepts and/or textual transcript of spoken passages are determined by extracting closed-captioning information from the audio or audio-visual work, or by use of speech recognition algorithms to obtain a stream of text from the input audio or audio-visual work. Many methods are well known to those of ordinary skill in the art for extracting closed-captioning information and many methods are well known to those of ordinary skill in the art for extracting text using speech recognition algorithms.

Concept Information Decoder 6800 accepts as input from Concept Determiner 6700 a stream of data which represents conceptual information. In accordance with the present invention, and without limitation, the conceptual information comprises: written transcript, raw text, keywords, phrases, or other representations of conceptual information which are well known to those of ordinary skill in the art. In response, Concept Information Decoder 6800 generates as output a stream of data representing keywords and concepts for the current portion of the input audio or audio-visual work being sent to TSM Subsystem 6300.

Concept Information Decoder 6800 processes the input to form concept data representations of the input data stream. For example, Concept Information Decoder 6800 may simply remove articles and adjectives from input which is a transcript to provide output comprised only nouns and noun phrases. Alternatively Concept Information Decoder 6800 may employ natural language processing to extract conceptual content from a stream of spoken words. Many methods of implementing Concept Information Decoder are well known to those of ordinary skill in the art.

TSM Concept Look-Up 6500 accepts as input: (a) a CSA data structure which is received from Digital Storage Device 6075, (b) data from Concept Information Decoder 6800 that represents concepts for the current portion of the input audio or audio-visual work being sent to TSM Subsystem 6300; and (c) parameter Theta from UIP/PC 6200. TSM Concept Look-Up 6500 uses a database or scratch-pad memory to maintain a list of records in which each record stores information pertaining to the TSM rate and concept information for the TSM rate. TSM Concept Look-Up 6500 performs the follow steps in accordance with any one of the many methods which are well known to those of ordinary skill in the art. It searches the database containing the CSA data structure for the closest matching concept entry. If the difference between the closest matching entry is within a range specified by a parameter Theta, the TSM rate associated with that entry is provided as output. If no concept entries in the database containing the CSA data structure are within the distance specified by the parameter Theta, then the previously obtained TSM rate is provided as output which is received by TSM Rate Arbiter 6400.

TSM Rate Arbiter 6400 receives as input: (a) a TSM rate from User Input Processor 6200 that is specified by the user; (b) a TSM rate from TSM Concept Look-Up 6500; and (c) parameters Offset, Slew-Limit, and Override from UIP/PC 6200 that will be described in detail below. In response, TSM Rate Arbiter 6400 produces as output a single TSM rate which is transmitted to TSM Subsystem 6300.

TSM Rate Arbiter 6400 determines the TSM rate, or playback rate, using any one of the following modes of operation:

1. CSA data structure Driven Playback: In this mode, the TSM rate used is the TSM rate provided by TSM-Concept Look-Up 6500.
2. CSA data structure Offset Playback: In this mode, the user specifies, via UIP 6100, Offset, an offset parameter that is be used to adjust the TSM rate specified in the CSA data structure. The TSM Rate output is given by the following formula:

$$TSM\_rate = TSM \text{ rate from } TSM\text{-Concept Look-Up}*(1+\text{Offset})$$

For example, if a user specifies an offset of −0.4, TSM Rate Arbiter 6400 will add the −0.4 offset to the number 1 (resulting in the value 0.6) and scale each of the TSM rates specified by TSM-Concept Look-Up 6500 to achieve a uniform decrease (slow down) in the TSM rate, or playback rate, for the output signal produced. Similarly a positive offset would increase (speed up) the TSM rate, or playback rate, for the output signal produced. Note that an offset value of zero has no effect on the TSM rate. As one can readily appreciate different offset strategies may be employed to achieve non-linear and linear scaling of the TSM rates.

3. User Override of CSA data structure: In this mode, the user can override a TSM rate obtained from the TSM-Concept Look-Up 6500 and manually control the TSM rate, or playback rate, for portions of the audio or audio-visual work. When the override is released by the user, the TSM rate used to determine the playback rate of the output signal is taken from the TSM-Concept Look-Up 6500 which utilizes the CSA data structure entry corresponding to the conceptual information in the current segment of the audio or audio-visual work.

TSM Rate Arbiter 6400 uses a slew-rate parameter specified by the user to limit the rate of change of the TSM rate at its output in order to create smooth transitions between different TSM rates. TSM Arbiter 6400 may also scan ahead in the input stream to predict the appropriate rate of change over the audio or audio-visual work being played. In this manner, the time-lag associated with changes in TSM rate is reduced as described below.

As one can readily appreciate, the TSM rates, or playback rates, output from TSM Concept Look-Up 6500 can vary rapidly. The input parameter Slew_Limit is used to control the rate of change of the playback rate. Slew_Limit filters out large transients in the TSM rate, or playback rate, by forcing a gradual change in the playback speed by insuring that the magnitude of any transition in TSM rate is below the amount specified in the Slew_Limit parameter. It is important to note, however, that when a small value of Slew_Limit is selected, the amount of time necessary to transition to a new TSM rate, or playback rate, is lengthened. This can have an undesirable side effect of causing the playback rate response to seem sluggish. For example, consider what happens if the input is being played back at twice the normal speed and an item of interest is encountered which causes TSM Concept Look-Up 6500 to output a TSM rate, or playback rate, of one-half normal speed. In this case, input parameter Slew_Limit may impose such a long transition time, that the word of interest will not be played back at the speed determined from the CSA data structure entry. One way to avoid this undesirable side effect is for TSM Concept Look-Up 6500 to scan ahead in the audio or audio-visual input stream and obtain future values of TSM rates, or playback rates, which can be used to determine the target TSM rate for upcoming sections of the audio or audio visual work. When the target TSM rate for an upcoming segment differs such that the Slew_Limit would prevent the TSM rate from adjusting quickly enough, TSM Rate Arbiter 6400 could initiate an earlier transition in the TSM rate, or playback rate by adjusting the TSM rate for current segments in a direction toward the future TSM rates specified. Another way to avoid the undesirable effect of long transition times due to small values for the Slew_Limit is to delay the audio or audio-visual input stream by buffering it by a fixed amount equal to the amount that TSM Concept Look-Up 6500 would read ahead. This shifts the TSM rate transitions slightly earlier in the audio or audio-visual input stream, resulting in an output stream in which speed changes occur early enough that the concepts are played at the rate specified from TSM Concept Look-Up 6500 and the speed transitions adhere to the Slew-Limit.

Figure 12:
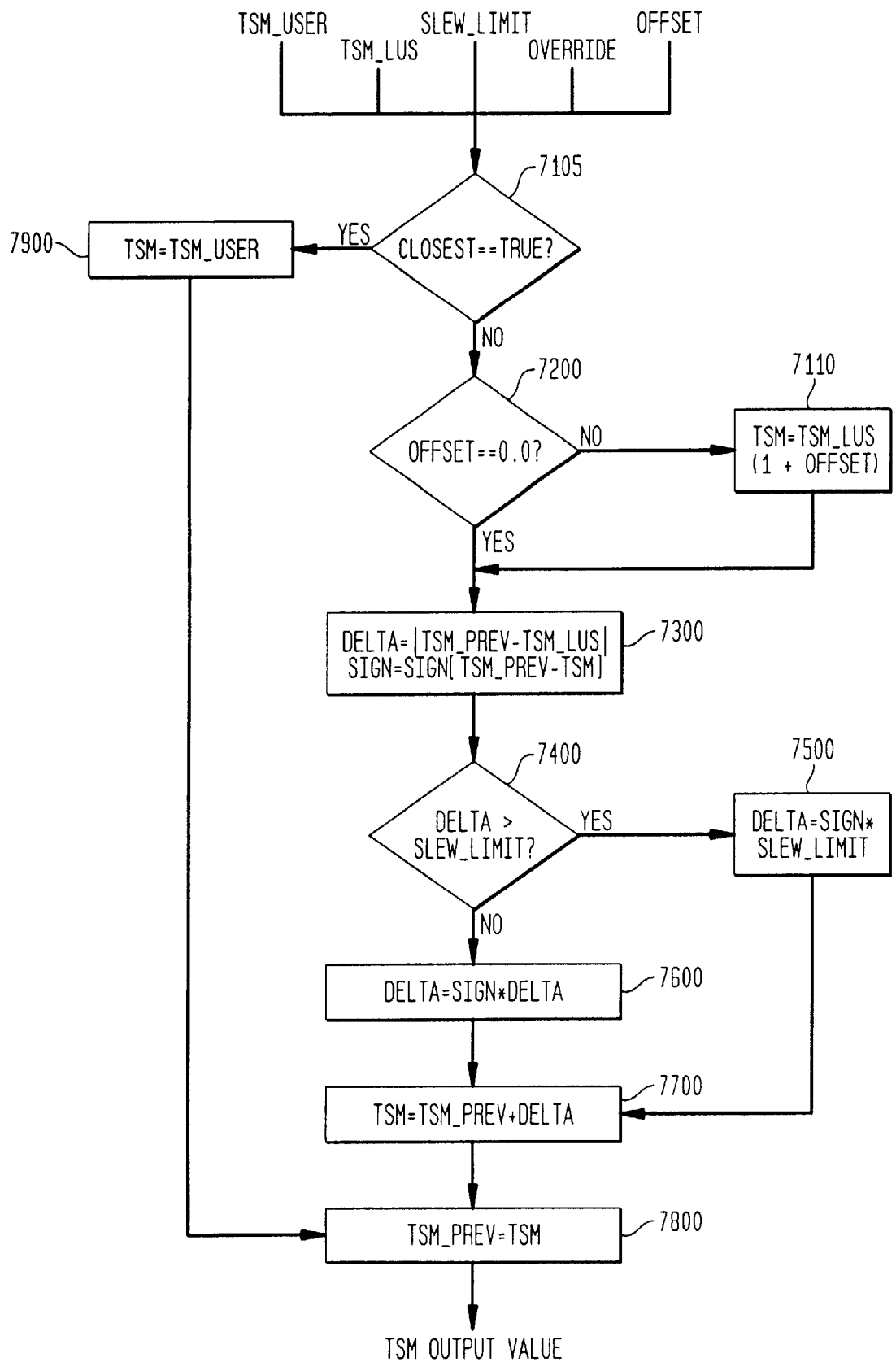
FIG. 12 shows a flowchart of an algorithm used in one embodiment of a TSM Rate Arbiter shown in FIG. 11 to provide a TSM rate, or playback rate.

FIG. 12 shows a flowchart of an algorithm used in one embodiment of TSM Rate Arbiter 6400 to provide a TSM rate, or playback rate.

As shown in FIG. 12, the following are applied as input to box 7105: (a) a TSM rate specified by the user (TSM_USER) which is received from UIP/PC 6200; (b) a TSM rate output by TSM Concept Look-Up 6500 (TSM_LUS); (c) a slew limit parameter (Slew_Limit) specified by the user which is received from UIP/PC 6200; (d) an override flag (Override) specified by the user which is received from UIP/PC 6200; and (e) an offset value (Offset) specified by the user which is received from UIP/PC 6200.

At box 7105 a decision is made to determine whether Override is true. If so, control is transferred to box 7900; otherwise, control is transferred to box 7200. At box 7200 a decision is made to determine whether Offset is equal to 0.0. If so, control is transferred to box 7300, otherwise, control is transferred to box 7110.

At box 7300, the following variables are computed: Delta=|TSM_Prev−TSM_LUS| and Sign=sign[TSM_Prev−TSM_LUS], where TSM_Prev is the TSM rate previously determined. Control is then transferred to box 7400.

At box 7400, a decision is made based on a comparison between Delta and Slew_Limit. If Delta is greater than Slew_Limit, control is transferred to box 7500; otherwise, control is transferred to box 7600.

At box 7600, Delta is set equal to Sign*Delta and control is then transferred to box 7700. At box 7500, Delta is set equal to Sign*Slew_Limit and control is then transferred to box 7700. At box 7700, TSM_Prev is set equal to TSM_Prev+Delta and control is then transferred to box 7800. At box 7800, TSM_Prev is set equal to TSM and the value TSM is provided as output.

At box 7900, TSM is set equal to TSM_User and control is then transferred to box 7800. Finally, at box 7110, TSM is set equal to TSM_LUS*(1+Offset) and control is then transferred to box 7300.

Combinations of the above-described modes of operation are also within the scope of the present invention. For example, a user may elect to combine a user offset with the use of a CSA data structure for close-captioning information embedded in the audio or audio-visual work to be played to determine the TSM rate desired for the output signal.

The output from embodiment 6000 is a stream of digital samples which comprise a digitized audio or audio-visual stream which is a Time-Scaled Modification of the input audio or audio-visual work and, in accordance with the present invention, reflects the TSM rates, or playback rates, specified by the CSA data structure and/or user input. This output represents the LIF work.

In some embodiments, embodiment 6000 also stores the LIF work for later replay by the same embodiment or by other replay devices. In addition, the digital output can be transformed to analog form for storage on analog devices. There are many apparatus which are well known to those of ordinary skill in the art for receiving a digitized input signal, such as a 16-bit Pulse Code Modulation, and for providing an analog signal output therefrom. For example, it is well known to those of ordinary skill in the art that commercially available equipment exists for receiving a stream of digitized samples representing a signal and for converting those samples to an analog signal without loss of fidelity. As one of ordinary skill in the prior art can readily appreciate, whenever embodiment 6000 provides playback for an audio-visual work, TSM Subsystem 6300 speeds up or slows down visual information to match the audio in the audio-visual work. To do this in a preferred embodiment, the video signal is "Frame-subsampled" or "Frame replicated" in accordance with any one of the many methods known to those of ordinary skill in the prior art to maintain synchronism between the audio and visual portions of the audio-visual work. Thus, if one speeds up the audio and samples are requested at a faster rate, the frame stream is subsampled, i.e. frames are skipped.

Although FIG. 11 shows embodiment 6000 to be comprised of separate modules, in a preferred embodiment, UI 6100, UIP/PC 6200, TSM Subsystem 6300, TSM Rate Arbiter 6400, TSM Concept Look-Up 6500, Concept Determiner 6700, and Concept Information Decoder 6800 are embodied as software programs or modules which run on a general purpose computer such as, for example, a personal computer. Furthermore, Digital Storage Device 6075 is embodied as a disk drive or Random Access Memory and Digital to Analog Converter 6600 is embodied as a typical accessory to a general purpose computer such as a sound-card on a personal computer. It should be well known to one of ordinary skill in the art, in light of the detailed description above, how to implement these programs or modules in software.

Applications of the Present Invention

The following describes examples of use of the inventive method and apparatus. A first example of use of the inventive method and apparatus is in conjunction with teaching using audio-visual works. The inventive apparatus allows the TSM rate, or playback rate, of a particular audio-visual work to be controlled on a per user basis or on a common basis that is targeted to specific groups of listeners. For example, assume an instructional audio-visual work is used to instruct viewers in details of how to setup and use an order entry accounting system on a particular operating system to enter and report specific types of financial transactions. Further assume the target audience for the instructional audio-visual work consists of two groups: (a) accountants who are novice computer users and (b) expert computer users who are unfamiliar with standard accounting practices. During playback of the audio-visual work, material is presented in following manner. A particular financial transaction is described along with appropriate actions in the user interface of the software program such as "select the pull-down menu and enter NEW"; then a demonstration of the actual process is performed. During playback of this audio-visual work at normal speed, accounting experts who are novice computer users would become impatient with the description of the financial transactions with which they are already familiar, but these same individuals might think the pace of the instruction is too fast during the demonstration of how entry in the software is performed since they are unfamiliar with the use of such interfaces. Similarly for those viewers who are expert computer users but novice accountants, the pace of the instruction (speaking rate) may seem too brisk during the discussion of particular financial transactions, but these same individuals would become impatient with the slow methodical demonstration of the entry process which has already been described verbally. Embodiments of the present invention solve this problem in the following manner. Two Speed Contours are shipped with the audio-visual work. One Speed Contour is for expert computer users who are novice accountants (FastCompSlowAcc.spdcon) and another Speed Contour is for expert accountants who are novice computer users (FastAccSlowComp.spdcon). Speed Contour Fast-CompSlowAcc.spdcon specifies TSM rates that speed through the audio-visual segments containing the demonstrations and slow-down the playback rate during the description of accounting transactions. Speed Contour FastAccSlowComp.spdcon specifies TSM rates that slow down the playback rate during the demonstrations and speed through the audio-visual segments describing accounting transactions. By loading the appropriate Speed Contour, each target audience can receive the information at a rate which suits their particular comprehension rate for appropriate segments of the audio-visual work. As a result, embodiments of the present invention obviate the need to produce multiple versions of the same audio-visual work for different target audiences.

In the example presented above, viewers of the audio-visual work were divided into two specific groups. However, in many cases, the creators of an audio-visual work are not familiar with the comprehension rate of the audience that will be viewing the material presented in the work. In this case, each user may load a Conceptual Speed Association data structure that contains information about the ideal presentation rate for particular concepts and passages with key words and phrases. The Conceptual Speed Association data structure enables users to view information at a presentation rate that suits their own comprehension rates for different material.

A second example of use of the inventive method and apparatus is in conjunction with entertainment using audio-visual works. It should be readily appreciated by those of ordinary skill in the art that embodiments of the present invention are not limited to the pairing of presentation rate with comprehension rates during instructional audio-visual works. In fact, embodiments of the present invention also solves the problem of pairing presentation rate with interest level or entertainment level of a particular audio-visual work to provide greater enjoyment for listener/viewers. For example, listeners and movie viewers may employ CSA data structures or Speed Contours in accordance with the present invention to control the playback rate of an audio or audio-visual work so that passages or scenes of violence and suspense are played at a faster rate to avoid undue anxiety. Similarly, those listeners and movie viewers interested in romantic dialog may elect to use CSA data structures or Speed Contours in accordance with the present invention to have the playback rate reduced for these passages. As one can readily appreciate each user or family may utilize CSA data structures which reflect their interests to act as a "filter" and use embodiments of the present invention to create LIF works for ordinary movies, television shows, and other entertainment audio or audio-visual works. Furthermore, as one can readily appreciate, a valuable service in accordance with the present invention would provide CSA data structures or Speed Contours for specific audio or audio-visual works which could be used to change the content of the work. For example, the Movie Rating could be changed from "R" to "PG-13" by use of a Speed Contour which eliminated certain passages containing adult language or concepts.

It should be noted that once a CSA data structure is generated, it thereafter be used to guide playback rates for audio or audio-visual works which are previously unheard by the listener. In this manner the concept and TSM rate pairings representing interest, comprehension rate, and the like obtained by listening to various audio and audio-visual works can be captured, stored and later used to guide the TSM rate, or playback rate, for audio and audio-visual works being played for the first time by a listener. Thus, a CSA data structure can be used to control the playback rate or to create Speed Contours which are tailored to the interest of a user automatically for works which have never been heard by the user. This ability to control the playback rate or to create Speed Contours for unheard works, enables embodiments of the present invention to act as information filters which tailor the delivery rate of all audio and audio-visual works presented to the user in accordance with the user's interest level for concepts contain in the CSA data structure.

A third example of use of the inventive method and apparatus is in conjunction with content production and advertising. In this example, a Speed Contour which captures the interest and maintains listener/viewer attention may be determined by sampling a particular target audience or market segment. For instance, if a commercial is targeted toward people who own a particular brand or model of computer, the commercial producers can shoot one commercial and adjust the Speed Contour to capture the attention of its target audience by delivering the information at a presentation rate appropriate for that target audience. Furthermore, different Speed Contours could be developed and sent to different radio or television stations and/or time-slots depending on familiarity of the stations' audience with the subject matter presented in the commercial. Thus, in accordance with the present invention, a particular commercial may be compressed to 20 seconds when it is played during a talk show on home-computer maintenance using a first Speed Contour, and the same commercial may be expanded to 30 seconds when played during the evening news using a second Speed Contour to allow for the slower comprehension rate of those listeners who are unfamiliar with computer terminology.

A fourth example of use of the inventive method and apparatus is the application of a CSA data structure containing concept entries for numeric digits which are paired with TSM rates specifying slow playback rates. In this case the inventive method could be applied to voice mail systems when listeners retrieve their voice-mail messages. The Concept Determiner would perform simple speech recognition to determine the presence of numeric digits in the message. In this manner, all phone-numbers and numeric amounts would be slowed down automatically, and ease the transcription process for the user. Further, embodiments of the present invention can also be used to specify playback rates for concepts such as, without limitation, dates and addresses and the like.

A fifth example of use of the inventive method and apparatus is in conjunction with instruction and learning of foreign languages. Students listening to an audio or audio-visual work containing the foreign language of study would utilize embodiments of the present invention to create a Speed Contour while listening to various passages. The Speed Contour would reflect their comprehension rate for the material by showing passages that were requested to be played more slowly than others, or were repeated. The Speed Contour could then be used to score students, and to direct their future study. For example, they could listen to audio or audio-visual works using customized Speed Contours which would provide further practice in listening to rapidly spoken passages to aid in developing word parsing skills. Furthermore, a CSA data structure created while using embodiments of the present invention to listen to material presented in foreign or native languages could be used to analyze which concepts are troublesome for particular students. In this manner, identical audio or audio-visual works could be presented to a class in which each student utilizes the invention to obtain CSA data structures which contain information about the comprehension rates for concepts in the material contained in the works. CSA data structures could then be presented graphically or ordered by concept to allow instructors to grade individuals and/or to gauge the comprehension rate of each student or groups of students. For example, the one would develop a metric related to user requested playback speed and comprehension or familiarity with subject matter embodied in concepts.

Those skilled in the art will recognize that the foregoing description has been presented for the sake of illustration and description only. As such, it is not intended to be exhaustive or to limit the invention to the precise form disclosed.

For example, it should be clear to those of ordinary skill in the art that the audio or audio-visual works described herein can be input to embodiments of the present invention from the internet. It should also be clear to those of ordinary skill in the art that embodiments of Speed Contours or CSA data structures may be used to filter information accessed on the internet. Still further, it should be clear that embodiments of the present invention may be included as parts of search engines used to access audio or audio-visual works on the internet.

As a further example, in embodiments of the present invention, a Speed Contour may contain TSM rate entries, for example, of "infinity" for particular portions of an audio or audio-visual work. In such embodiments of the present invention, a TSM rate of "infinity" (or some other indicium that will be similarly translated) directs a playback system to skip sections of an audio or audio-visual work associated with a TSM rate of infinity. Thus, in accordance with such embodiments, users can specify "no interest" in particular portions when listening to or searching audio or audio-visual works.

As a further example, it should be clear to those of ordinary skill in the art that embodiments of the present invention include: (a) a computer-readable medium encoded with a CSA data structure; (b) a computer-readable medium encoded with a Speed Contour; (c) a computer-readable medium encoded with an audio or audio visual work together with a CSA data structure; and (d) a computer-readable medium encoded with an audio or audio visual work together with a Speed Contour. In the case of a computer-readable medium encoded with an audio or audio visual work together with a CSA data structure or a Speed Contour, many methods exist that are well known to those of ordinary skill in the art for storing an audio or audio visual work together with a CSA data structure or a Speed Contour.

What is claimed is:

1. An apparatus for generating a speed contour which includes an affinity information used to obtain a time-scale modification (TSM) rate and an identifier information used to obtain an identifier of a portion of an audio or audio-visual work associated with the TSM rate, which apparatus comprises:
   a user input apparatus that receives user information and directs input of a portion of the audio or audio-visual work;
   a time-scale modification system, responsive to an identifier of the portion, the portion, and the TSM rate, that generates a time-scale modified portion;
   a time-scale modification monitor, responsive to at least a portion of the user information, the identifier of the portion, and the portion, that generates the TSM rate and the identifier of a portion associated with the TSM rate; and
   a speed contour generator, responsive to the TSM rate and the identifier of the associated portion, that generates the speed contour.

2. The apparatus of claim 1 which further comprises a storage device, responsive to the speed contour, that stores the speed contour.

3. The apparatus of claim 2 wherein the speed contour is stored with user identification contained within the user information.

4. The apparatus of claim 3 wherein the speed contour generator generates a speed contour which is a function of several speed contours generated for a particular user.

5. The apparatus of claim 3 wherein the speed contour generator generates a speed contour which is a function of several speed contours generated for different users.

6. The apparatus of claim 1 wherein the time-scale modification monitor, responsive to predetermined user information, generates one or more particular TSM rates and wherein the time-scale modification system, responsive to the one or more particular TSM rates, does not generate the time-scale modified portion.

7. The apparatus of claim 1 which further comprises display apparatus, responsive to the speed contour, which displays the speed contour.

8. The apparatus of claim 1 which further comprises playback apparatus, responsive to the time-scale modified portion, that plays the time-scale modified portion.

9. The apparatus of claim 8 which further comprises a storage device, responsive to the time-scale modified portion, that stores the time-scale modified portion.

10. The apparatus of claim 9 which further transmits the time-scale modified portion to another apparatus.

11. The apparatus of claim 1 wherein the affinity information comprises a measure of user interest in the portion.

12. The apparatus of claim 1 wherein the affinity information comprises a derivative of the TSM rate.

13. The apparatus of claim 12 wherein the derivative is a first derivative.

14. The apparatus of claim 1 which further transmits the speed contour to another apparatus.

15. The apparatus of claim 1 which further transmits the speed contour to another apparatus along with user identification.

16. A method for generating a speed contour which includes an affinity information used to obtain a time-scale modification (TSM) rate and an identifier information used to obtain an identifier of a portion of an audio or audio-visual work associated with the TSM rate, which method comprises steps of:
  obtaining user information and directing input of a portion of the audio or audio-visual visual work;
  generating a time-scale modified portion responsive to an identifier of the portion, the portion, and the TSM rate;
  generating the TSM rate and the identifier of a portion associated with the TSM rate responsive to the user information, the identifier of the portion, and the portion; and
  generating the speed contour responsive to the TSM rate and the identifier of the associated portion.

17. An apparatus for generating a conceptual speed association data structure which includes an affinity information used to obtain a time-scale modification (TSM) rate and a concept information used to obtain a concept identifier for a portion of an audio or audio-visual work associated with the TSM rate, which apparatus comprises:
  a user input apparatus that receives user information and directs input of a portion of the audio or audio-visual work;
  a time-scale modification system, responsive to an identifier of the portion, the portion, and the TSM rate, that generates a time-scale modified portion;
  a concept decoder, responsive to the identifier of the portion and the portion, that generates one or more concepts for the portion;
  a time-scale modification concept monitor, responsive to the user information and the one or more concepts, that generates the TSM rate and a concept identifier associated with the TSM rate; and
  a conceptual speed association data structure generator, responsive to the TSM rate and the associated concept identifier, that generates the conceptual speed association data structure.

18. The apparatus of claim 17 which further comprises a storage device, responsive to the conceptual speed association data structure, which stores the conceptual speed association data structure.

19. The apparatus of claim 18 wherein the conceptual speed association data structure is stored with user identification contained within the user information.

20. The apparatus of claim 19 wherein the conceptual speed association data structure generator generates a conceptual speed association data structure which is a function of several conceptual speed association data structures generated for a particular user.

21. The apparatus of claim 19 wherein the conceptual speed association data structure generator generates a conceptual speed association data structure which is a function of several conceptual speed association data structures generated for a number of different users.

22. The apparatus of claim 17 wherein the time-scale modification concept monitor, responsive to predetermined user information, generates one or particular TSM rates and wherein the time-scale modification system, responsive to the one or more particular TSM rates, does not generate the time-scale modified portion.

23. The apparatus of claim 17 which further comprises display apparatus, responsive to the conceptual speed association data structure, which displays the conceptual speed association data structure.

24. The apparatus of claim 17 which further comprises playback apparatus, responsive to the time-scale modified portion, that plays the time-scale modified portion.

25. The apparatus of claim 24 which further comprises a storage device, responsive to the time-scale modification portion, that stores the time-scale modified portion.

26. The apparatus of claim 17 wherein the concept decoder includes an algorithm for recognizing categories of concepts.

27. The apparatus of claim 26 wherein one of the categories include numbers.

28. The apparatus of claim 17 wherein the concept decoder comprises a concept determiner that provides output to a concept information decoder, which concept determiner inputs closed-captioning data or textual annotation stored with the portion of the audio or audio-visual work.

29. The apparatus of claim 17 wherein the concept decoder comprises a concept determiner that provides output to a concept information decoder, which concept determiner includes speech recognition apparatus.

30. The apparatus of claim 17 wherein the time-scale modification concept monitor creates a single TSM rate for a concept by performing a mathematical function of the TSM rates over the interval of the input audio or audio-visual work associated with that single concept.

31. The apparatus of claim 30 wherein the mathematical function comprises forming a mathematical average.

32. The apparatus of claim 30 wherein the mathematical function comprises forming a weighted average which emphasizes most recent TSM values obtained during the interval in which a particular concept was present at the input to the time-scale modification concept monitor.

33. The apparatus of claim 17 which further transmits the time-scale modified portion to another apparatus.

34. The apparatus of claim 17 wherein the time-scale modification concept monitor generates the TSM rate associated with a particular concept as a function of the number of times the particular concept has appeared in the work.

35. The apparatus of claim 17 wherein the time-scale modification concept monitor creates a multiplicity of TSM rates for a concept.

36. The apparatus of claim 35 wherein the multiplicity of TSM rates cause the TSM rate to increase as the concept is repeated throughout the audio or audio-visual work.

37. The apparatus of claim 17 wherein the affinity information comprises a derivative of the TSM rate.

38. The apparatus of claim 37 wherein the derivative is a first derivative.

39. The apparatus of claim 17 which further transmits the conceptual speed association data structure to another apparatus.

40. The apparatus of claim 17 which further transmits the conceptual speed association data structure to another apparatus along with user identification.

41. A method for generating a conceptual speed association data structure which includes an affinity information used to obtain a time-scale modification (TSM) rate and a concept information used to obtain a concept identifier for a portion of an audio or audio-visual work associated with the TSM rate, which method comprises steps of:
  obtaining user information and directing input of a portion of the audio or audio-visual work;
  generating a time-scale modified version of the portion responsive to an identifier of the portion, the portion, and the TSM rate;
  generating one or more concepts for the portion responsive to the identifier of the portion and the portion;
  generating the TSM rate and a concept associated with the TSM rate responsive to the user information and the one or more concepts; and
  generating the conceptual speed association data structure responsive to the TSM rate and the associated concept.

42. An apparatus which plays an audio or audio-visual work in conjunction with a speed contour which includes an affinity information used to obtain a first time-scale modification (TSM) rate and an identifier information used to obtain an identifier of a portion of an audio or audio-visual work associated with the first TSM rate, which apparatus comprises:

- an input apparatus that directs input of a portion of the audio or audio-visual work, wherein the input apparatus further comprises a user input apparatus that receives user information;
- a time-scale modification system, responsive to an identifier of the portion, the portion, and a TSM rate, that generates a time-scale modified portion;
- playback apparatus, responsive to the time-scale modified portion, that plays the time-scale modified portion; and
- a time-scale modification rate determiner, responsive to the speed contour, to the information, and to the identifier of the portion, that generates the TSM rate.

43. The apparatus of claim 42 wherein the user information includes an offset and wherein the time-scale modification rate determiner generates the TSM rate using the offset.

44. The apparatus of claim 42 wherein the user information includes a user specified quantization step to a TSM rate and the time-scale modification rate determiner generates the TSM rate using the user specified quantization step.

45. A method for playing an audio or audio-visual work in conjunction with a speed contour which includes an affinity information used to obtain a first time-scale modification (TSM) rate and an identifier information used to obtain an identifier of a portion of an audio or audio-visual work associated with the first TSM rate, which method comprises steps of:

- directing input of a portion of the audio or audio-visual work, and receiving user information;
- generating a time-scale modified portion responsive to an identifier of the portion, the portion, and a TSM rate;
- playing the time-scale modified portion; and
- generating the TSM rate responsive to the speed contour, the user information, and the identifier of the portion.

46. An apparatus which plays an audio or audio-visual work in conjunction with a conceptual speed association data structure which includes an affinity information used to obtain a first time-scale modification (TSM) rate and a concept information used to obtain a concept identifier for a portion of an audio or audio-visual work associated with the first TSM rate, which apparatus comprises:

- an input apparatus that directs input of a portion of the audio or audio-visual work;
- a time-scale modification system, responsive to an identifier of the portion, the portion, and a TSM rate, that generates a time-scale modified portion;
- playback apparatus, responsive to the time-scale modified portion, that plays the time-scale modified portion;
- a concept decoder, responsive to the identifier of the portion and the portion, that generates one or more concepts for the portion; and
- a time-scale modification concept look-up system, responsive to the one or more concepts and the conceptual speed association data structure, that generates the TSM rate.

47. The apparatus of claim 46 wherein the input apparatus further comprises a user input apparatus that receives user information and wherein the time-scale modification concept look-up system is also responsive to the user information to generate the TSM rate.

48. The apparatus of claim 47 wherein the user information includes an offset and wherein the time-scale modification concept look-up system generates the TSM rate using the offset.

49. The apparatus of claim 47 wherein the user information includes a user specified quantization step to a TSM rate and the time-scale modification concept look-up system generates the TSM rate using the user specified quantization step.

50. The apparatus of claim 47 wherein the user information includes a concept and a TSM rate for that concept and the time-scale modification concept look-up system generates the TSM rate using the user specified concept and TSM rate.

51. The apparatus of claim 46 wherein the time-scale modification concept look-up system searches the conceptual speed association data structure for concept entries within a range of the one or more concepts.

52. The apparatus of claim 51 wherein, if no concept entries are within the range, the previously obtained TSM rate is used.

53. The apparatus of claim 46 wherein the time-scale modification concept look-up system generates the TSM rate associated with a particular concept as a function of the number of times the particular concept has appeared in the work.

54. A method for playing an audio or audio-visual work in conjunction with a conceptual speed association data structure which includes an affinity information used to obtain a first time-scale modification (TSM) rate and a concept information used to obtain a concept identifier for a portion of an audio or audio-visual work associated with the first TSM rate, which method comprises steps of:

- directing input of a portion of the audio or audio-visual work;
- generating a time-scale modified portion responsive to an identifier of the portion, the portion, and a TSM rate;
- playing the time-scale modified portion;
- generating a concept for the portion responsive to the identifier of the portion and the portion; and
- generating the TSM rate responsive to the concept, and the conceptual speed association data structure.

55. The method of claim 54 wherein the step of generating the TSM rate comprises searching the conceptual speed association data structure for concept entries within a range of the one or more concepts.

56. The method of claim 55 wherein, if no concept entries are within the range, the previously obtained TSM rate is used.

57. The method of claim 54 wherein the step of generating the TSM rate includes generating the TSM rate associated with a particular concept as a function of the number of times the particular concept has appeared in the work.

58. An apparatus for converting a speed contour which includes an affinity information used to obtain a time-scale modification (TSM) rate and an identifier information used to obtain an identifier of a portion of an audio or audio-visual work associated with the TSM rate into a conceptual speed association data structure which includes an affinity information used to obtain a time-scale modification (TSM) rate and a concept information used to obtain a concept identifier for a portion of an audio or audio-visual work associated with the TSM rate, which apparatus comprises:

- an input apparatus, responsive to the speed contour, that determines a TSM rate for a portion and an identifier of the portion and directs input of the portion of the audio or audio-visual work;

a concept decoder, responsive to an identifier of the portion and the portion, that generates one or more concepts for the portion;

a time-scale modification concept monitor, responsive to the one or more concepts and the TSM rate, that associates a concept identifier with the TSM rate; and a conceptual speed association data structure generator, responsive to the TSM rate and the associated concept identifier, that generates the conceptual speed association data structure.

59. An apparatus for converting a conceptual speed association data structure which includes an affinity information used to obtain a time-scale modification (TSM) rate and a concept information used to obtain a concept identifier for a portion of an audio or audio-visual work associated with the TSM rate into a speed contour which includes an affinity information used to obtain a time-scale modification (TSM) rate and an identifier information used to obtain an identifier of a portion of an audio or audio-visual work associated with the TSM rate, which apparatus comprises:

an input apparatus that directs input of a portion of the audio or audio-visual work and determines an identifier of the portion;

a concept decoder, responsive to the identifier of the portion and the portion, that generates one or more concepts for the portion;

a time-scale modification concept look-up, responsive to the one or more concepts and the conceptual speed association data structure, that generates the TSM rate; and a speed contour generator, responsive to the TSM rate and the associated identifier of the portion, that generates the speed contour.

60. An apparatus for generating a speed contour which includes an affinity information used to obtain a time-scale modification (TSM) rate and an identifier information used to obtain an identifier of a portion of an audio or audio-visual work associated with the TSM rate, which apparatus comprises:

a user input apparatus that receives user information and directs input of a portion of the audio or audio-visual work;

a display apparatus, responsive to an identifier of the portion, that displays a representation of the input portion and the TSM rate associated with the portion;

an editor, in response to the user information, that provides an identifier for a user selected portion of the display and a user specified TSM rate for the user selected portion; and a speed contour generator, responsive to the user specified TSM rate, the associated TSM rate, and the identifier of the user selected portion, that generates the speed contour.

61. The apparatus of claim 60 wherein the display apparatus display comprises text material from close captioning material which is associated with the input portion.

62. The apparatus of claim 60 wherein the display apparatus display comprises text material that is determined by speech recognition of the input portion.

* * * * *